US012652739B1

(12) United States Patent
Kutej et al.

(10) Patent No.: US 12,652,739 B1
(45) Date of Patent: Jun. 9, 2026

(54) AVERAGE CURRENT REGULATION FOR DC-DC POWER CONVERTERS

(71) Applicant: SEMICONDUCTOR COMPONENTS INDUSTRIES, LLC, Scottsdale, AZ (US)

(72) Inventors: Jiri Kutej, Brno (CZ); Pavel Horsky, Brno (CZ); Jan Plojhar, Mokra Horakov (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 29 days.

(21) Appl. No.: 19/028,545

(22) Filed: Jan. 17, 2025

(51) Int. Cl.
| | |
|---|---|
| *H05B 45/375* | (2020.01) |
| *H02M 3/157* | (2006.01) |
| *H02M 3/158* | (2006.01) |
| *H05B 45/325* | (2020.01) |
| *H05B 45/38* | (2020.01) |

(52) U.S. Cl.
CPC .......... *H05B 45/375* (2020.01); *H02M 3/157* (2013.01); *H02M 3/1582* (2013.01); *H05B 45/325* (2020.01); *H05B 45/38* (2020.01)

(58) Field of Classification Search
CPC .. H02M 3/157; H02M 3/1582; H05B 45/325; H05B 45/375; H05B 45/38
See application file for complete search history.

(56) References Cited

U.S. PATENT DOCUMENTS

| | | | |
|---|---|---|---|
| 2006/0279353 A1 | 12/2006 | Atrash et al. |
| 2007/0019450 A1 | 1/2007 | Tiew |
| 2009/0284242 A1 | 11/2009 | Motz |

(Continued)

FOREIGN PATENT DOCUMENTS

| | | |
|---|---|---|
| EP | 2573575 B1 | 4/2016 |
| EP | 3965301 A1 | 9/2022 |

OTHER PUBLICATIONS

G.Walter und G.Herms: "Einführung in die Behandlung von Messfehlern"; Universität Rostock 2006; 44 pages; English Summary included.

(Continued)

*Primary Examiner* — Raymond R Chai
(74) *Attorney, Agent, or Firm* — Slayden Grubert Beard PLLC

(57) ABSTRACT
A DC-DC converter circuit is disclosed. The DC-DC converter circuit includes a high-side transistor, a low-side transistor, a peak comparator configured to compare a high-side current through the high-side transistor against a peak threshold, and a valley comparator configured to compare a low-side current through the low-side transistor against a valley threshold. The DC-DC converter circuit may also include a timer circuit configured to measure a first time period during which the high-side current is less than an average-current threshold, a second time period during which the high-side current is greater than the average-current threshold, a third time period during which the low-side current is greater than the average-current threshold, and a fourth time period during which the low-side current is less than the average-current threshold, and to adjust the peak and valley thresholds in response to the first, second, third, and fourth time periods.

20 Claims, 22 Drawing Sheets

(56) References Cited

U.S. PATENT DOCUMENTS

| | | | | |
|---|---|---|---|---|
| 2011/0018515 A1* | 1/2011 | McCloy-Stevens | ........................ | |
| | | | | H02M 3/1588 |
| | | | | 323/284 |
| 2013/0049723 A1 | 2/2013 | Latham | | |
| 2014/0028205 A1 | 1/2014 | Lischka | | |
| 2014/0070728 A1 | 3/2014 | Pflaum | | |
| 2018/0091103 A1 | 3/2018 | Stan et al. | | |
| 2020/0313553 A1 | 10/2020 | Horsky | | |
| 2021/0160985 A1 | 5/2021 | Eggermont | | |
| 2022/0329147 A1* | 10/2022 | Wen | .................... | H02M 1/0009 |
| 2022/0345040 A1* | 10/2022 | Couleur | .............. | H02M 1/0009 |
| 2023/0114513 A1* | 4/2023 | Wei | ........................ | H02M 3/158 |
| | | | | 323/271 |
| 2024/0333162 A1 | 10/2024 | Aoki | | |
| 2024/0410920 A1 | 12/2024 | Lin | | |
| 2025/0220792 A1 | 7/2025 | Horsky | | |
| 2025/0274113 A1* | 8/2025 | Pahkala | ................... | H03K 7/06 |
| 2025/0279723 A1* | 9/2025 | Pahkala | ................ | H02M 3/157 |

OTHER PUBLICATIONS

Back-Min Lim et al., "A 200-V 98.16%-Efficiency Buck LED Driver Using Integrated Current Control to Improve Current Accuracy for Large-Scale Single-String LED Backlighting Applications" IEEE Transactions On Power Electronics, vol. 31, No. 9, Sep. 2016.

Qi Cheng et al., "A Wide-Input-Range Low-Profile Adaptive Delay Compensated Hysteretic LED Driver With Enhanced Current Accuracy" IEEE Journal of Solid-State Circuits, vol. 57, No. 8, Aug. 2022.

Yong Qu et al., "A Low-EMI, High-Reliability PWM-Based Dual-Phase LED Driver for Automotive Lighting" IEEE Journal of Emerging and Selected Topics in Power Electronics, vol. 6, No. 3, Sep. 2018.

Zhidong Liu et al., "A Current-Accuracy-Enhanced Wide-Input-Range DC-DC LED Driver With Feedforward Synchronous Current Control" IEEE Transactions On Circuits and Systems-I: Regular Papers, vol. 65, No. 11, Nov. 2018.

* cited by examiner

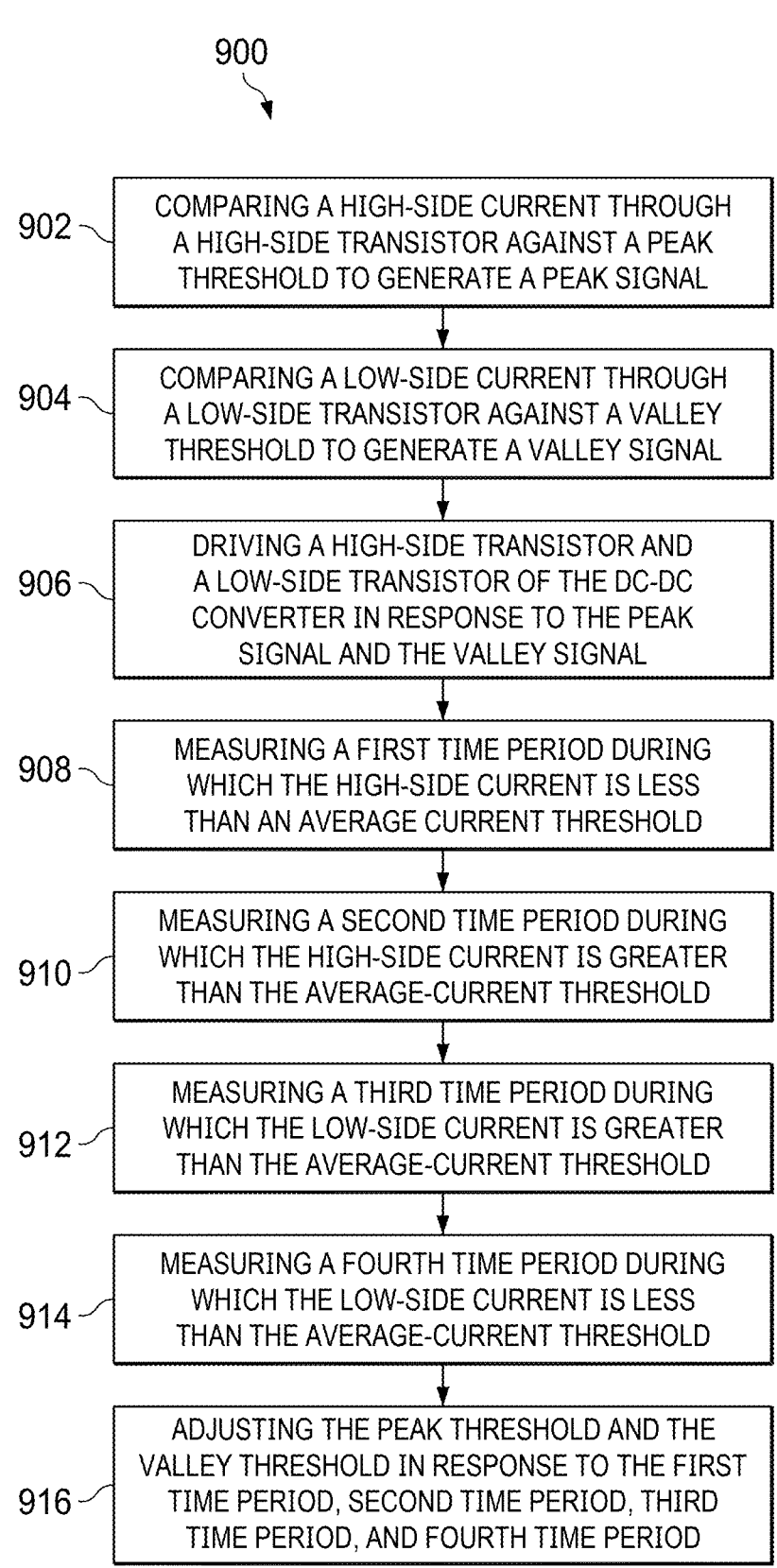

900

902 — COMPARING A HIGH-SIDE CURRENT THROUGH A HIGH-SIDE TRANSISTOR AGAINST A PEAK THRESHOLD TO GENERATE A PEAK SIGNAL

904 — COMPARING A LOW-SIDE CURRENT THROUGH A LOW-SIDE TRANSISTOR AGAINST A VALLEY THRESHOLD TO GENERATE A VALLEY SIGNAL

906 — DRIVING A HIGH-SIDE TRANSISTOR AND A LOW-SIDE TRANSISTOR OF THE DC-DC CONVERTER IN RESPONSE TO THE PEAK SIGNAL AND THE VALLEY SIGNAL

908 — MEASURING A FIRST TIME PERIOD DURING WHICH THE HIGH-SIDE CURRENT IS LESS THAN AN AVERAGE CURRENT THRESHOLD

910 — MEASURING A SECOND TIME PERIOD DURING WHICH THE HIGH-SIDE CURRENT IS GREATER THAN THE AVERAGE-CURRENT THRESHOLD

912 — MEASURING A THIRD TIME PERIOD DURING WHICH THE LOW-SIDE CURRENT IS GREATER THAN THE AVERAGE-CURRENT THRESHOLD

914 — MEASURING A FOURTH TIME PERIOD DURING WHICH THE LOW-SIDE CURRENT IS LESS THAN THE AVERAGE-CURRENT THRESHOLD

916 — ADJUSTING THE PEAK THRESHOLD AND THE VALLEY THRESHOLD IN RESPONSE TO THE FIRST TIME PERIOD, SECOND TIME PERIOD, THIRD TIME PERIOD, AND FOURTH TIME PERIOD

FIG. 9

AVERAGE CURRENT REGULATION FOR DC-DC POWER CONVERTERS

TECHNICAL FIELD

The disclosure relates generally to integrated circuit technology, and particularly to current regulation for DC-DC power converter circuits.

BACKGROUND

Switching power converters can be used to create a direct current ("DC") output from a regulated or unregulated voltage source by switching current through a magnetic element such as an inductor. DC-DC power converters may receive a regulated or unregulated DC voltage from an upstream power supply, and provide a regulated DC output current and/or DC output voltage to a load. In automotive lighting applications, for example, a DC-DC power converter may receive an unregulated DC voltage from a battery, and may provide a regulated DC output current to a set of light-emitting diodes (LEDs) coupled in series with each other. In such automotive lighting applications, different LEDs from within the set may be disabled at a given time by a pixel controller. The pixel controller may selectively control the projection of light from the set of LEDs by controlling switches that may short circuit certain selected LEDs at a given time.

The inventors of embodiments of the present disclosure have recognized that changing load conditions, including a changing number of LEDs coupled in series, may result in changes to the output voltage. The inventors of embodiments of the present disclosure have also recognized that a current regulation loop utilized to maintain the average current through a set of LEDs must respond quickly to such changes to the load and the output voltage conditions to avoid unwanted flickering. Embodiments of the present disclosure may address one or more of these challenges.

BRIEF DESCRIPTION OF THE DRAWINGS

A more complete understanding of the present embodiments may be acquired by referring to the following description taken in conjunction with the accompanying drawings, in which like reference numbers indicate like features.

FIG. 9 illustrates an example method for operating a DC-DC converter circuit in accordance with embodiments of the present disclosure.

DETAILED DESCRIPTION

Details of one or more embodiments are set forth in the description below and the accompanying drawings. Other features will be apparent from the description, drawings, and from the claims. The embodiments disclosed should not be interpreted, or otherwise used, as limiting the scope of the disclosure, including the claims. In addition, one skilled in the art understands that the following description has broad application, and the discussion of any embodiment is meant to be exemplary of that embodiment, and not intended to intimate that the scope of the disclosure, including the claims, is limited to that embodiment.

Various terms are used to refer to particular system components. Different companies may refer to a component by different names, and this disclosure does not intend to distinguish between components that differ in name but not form and function. In the following discussion and in the claims, the terms "including" and "comprising" are used in an open-ended fashion, and thus should be interpreted to mean "including, but not limited to." Also, the term "couple" or "coupled" is intended to mean either an indirect or direct connection. Thus, if a first device couples to, or is coupled to, a second device, that connection between the first device and the second device may be through a direct connection or through an indirect connection via other devices and connections.

Figure 1:
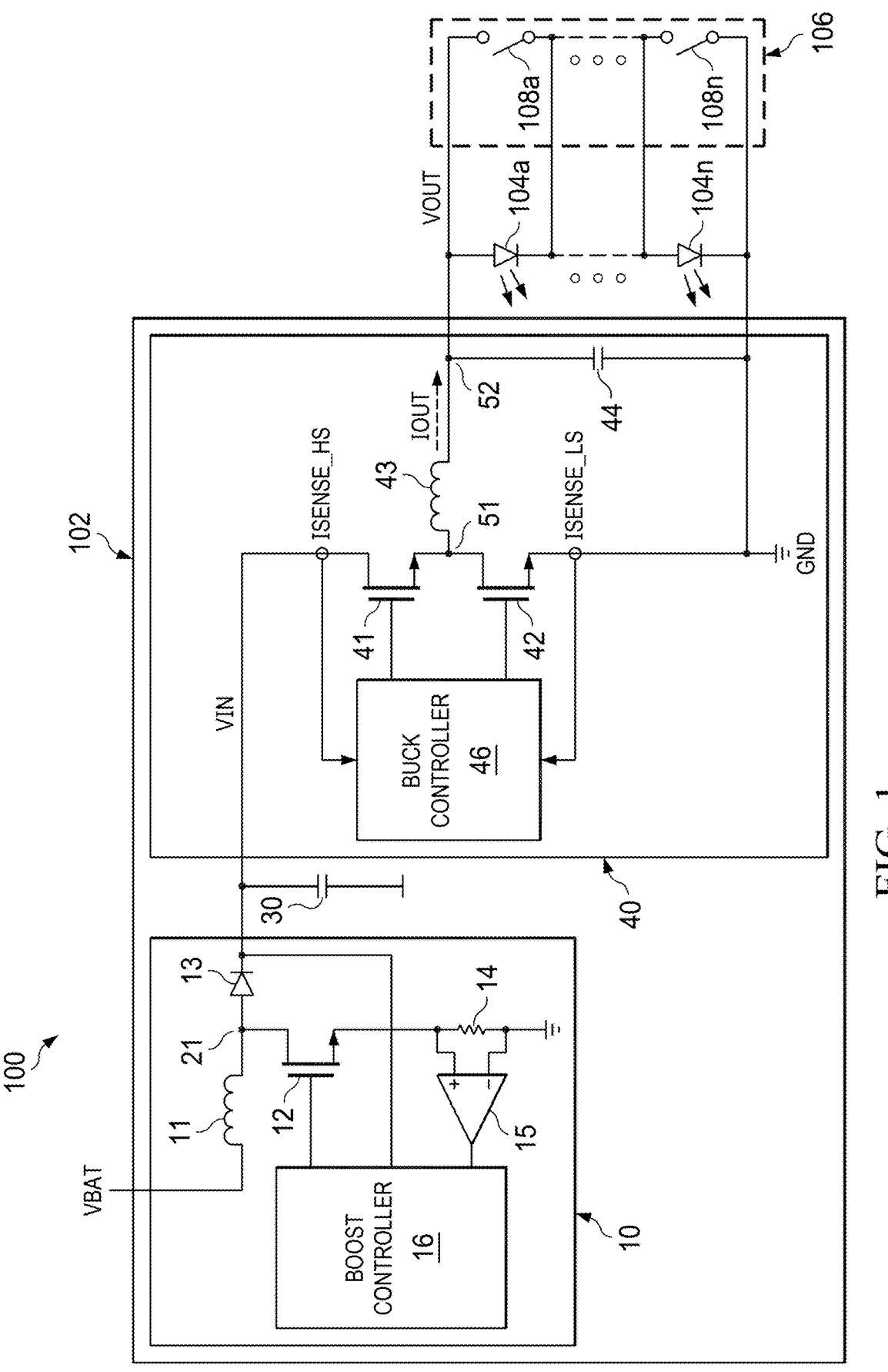
FIG. 1 illustrates a schematic diagram of an LED lighting system in accordance with embodiments of the present disclosure.

FIG. 1 illustrates a schematic diagram of an LED lighting system 100 in accordance with embodiments of the present disclosure. LED lighting system 100 may be implemented in any suitable fashion according to the operation described in the present disclosure. As shown in FIG. 1, LED lighting system 100 may include a LED driver 102, a plurality of LEDs 104a-104n coupled in series with each other, and a pixel controller 106 including a plurality of pixel switches 108a-108n coupled in series with each other and in parallel to the respective LEDs 104a-104n as shown in FIG. 1.

LED driver 102 may include one or more DC-DC power converter stages, which may operate together to provide a regulated output current IOUT to drive the plurality of LEDs 104a-104n at a desired brightness. For example, LED driver 102 may include boost converter 10 and buck converter 40. The input of boost converter 10 may be coupled to the battery voltage supply VBAT. Boost converter 10 may be a step-up converter and may provide an output voltage higher than VBAT. As shown in FIG. 1, buck converter 40 may have an input VIN coupled to the output of boost converter 10. Buck converter 40 may be a step-down converter, and may provide a regulated output current IOUT at an output voltage VOUT level lower than the voltage level of VIN. Although the embodiment illustrated in FIG. 1 includes both boost converter 10 and buck converter 40, some embodiments may omit boost converter 10 and may couple the input VIN of buck converter 40 directly to the battery voltage supply VBAT. For example, in automotive applications with a 12 volt battery, boost converter 10 may be utilized to step-up the 12 volt battery voltage to a higher voltage level suitable to provide buck converter 40 the head room to regulate the output current IOUT at a high enough output voltage VOUT level to turn on the plurality of LEDs 104a-104n. As another example, in automotive applications with a 48 volt battery, the 40 volt battery output may provide sufficient head room for buck converter 40. In such other applications, boost converter 10 may be omitted, and the input VIN of buck converter 40 may be coupled directly to the battery voltage supply VBAT.

Boost converter 10 may be implemented in any suitable fashion according to the operation described in the present disclosure. In some embodiments, boost converter 10 may include inductor 11, switch 12, diode 13, sense resistor 14, sense circuit 15, and boost controller 16. Inductor 11 may be coupled in series between a battery voltage supply VBAT and switching node 21. In some embodiments, switch 12 may be an n-type metal-oxide semiconductor field-effect transistor ("n-type MOSFET" or "NMOS transistor"). Switch 12 may have a drain coupled to switching node 21, and a source coupled in series with sense resistor 14 to ground GND. Diode 13 may have an anode coupled to switching node 21, and a cathode coupled to capacitor 30 at the output of boost converter 10. The resistance of sense resistor 14 may generate a sense voltage representative of the current through switch 12. Sense circuit 15 may sense the sense voltage, and thereby the current through switch 12, and provide an output representative of the sensed current to boost controller 16. As shown in FIG. 1, boost controller 16 may also receive a feedback signal representative of the boost output voltage provided to capacitor 30 at the output of boost converter 10. In response to the current feedback from sense circuit 15 and the output voltage feedback from the output of boost converter 10, boost controller 16 may control the duty cycle and the frequency at which switch 12 is turned on and off to regulate the voltage and/or current that is transferred to the output of boost converter 10.

Buck converter 40 may be implemented in any suitable fashion according to the operation described in the present disclosure. In some embodiments, and as shown in FIG. 1, buck converter 40 may include an input VIN coupled to capacitor 30 and the output of boost converter 10. And as described above, in other embodiments, VIN may be coupled directly to the battery voltage supply VBAT.

Buck converter 40 may include high-side transistor 41, low-side transistor 42, inductor 43, output capacitor 44, and buck controller 46. In some embodiments, high-side transistor 41 and low-side transistor 42 may be implemented at NMOS transistors. High-side transistor 41 may have a drain coupled to the input VIN of buck converter 40 and a source coupled to switching node 51. Low-side transistor 42 may include a drain coupled to switching node 51 and a source coupled to ground GND. Inductor 43 may be coupled between switching node 51 and an output node 52 of buck converter 40. Output capacitor 44 may be coupled between the output node 52 of buck converter 40 and ground GND.

As shown in FIG. 1, buck controller 46 may be coupled to drive the gates of high-side transistor 41 and low-side transistor 42. Buck controller 46 may drive high-side transistor 41 in an opposite manner as low-side transistor 42. For example, when high-side transistor 41 is driven in an on-state, low-side transistor 42 may be driven in an off-state. Similarly, when high-side transistor 41 is driven in an off-state, low-side transistor 42 may be driven in an on-state. As shown in FIG. 1, buck controller 46 may receive an high-side current-sense signal ISENSE_HS indicative of the current through high-side transistor 41. Buck controller 46 may also receive a low-side current-sense signal ISENSE_LS indicative of the current through low-side transistor 42. Buck controller 46 may in turn control the duty cycle and the frequency at which high-side transistor 41 and low-side transistor 42 are respectively switched on and off to regulate the output current IOUT at a desired level according to the desired brightness of the plurality of LEDs 104a-104n.

As shown in FIG. 1, LED lighting system 100 may include an N number of LEDs 104a through 104n coupled in series between the output of buck converter 40 and ground GND. Pixel controller 106 may similarly include an N number of pixel switches 108a-108n, each corresponding to one of the N number of LEDs 104a-104n. As shown in FIG. 1, each of the pixel switches 108a-108n may be coupled in parallel to a respective one of the LEDs 104a-104n, and may thus be configured to selectively short circuit a respective one of the LEDs 104a-104n to turn that particular LED off. For example, in automotive headlamp applications, pixel controller 106 may dynamically guide the light collectively emitted by LEDs 104a-104n by selectively turning pixel switches 108a-108n on and off to dynamically enable and disable different LEDs from among the plurality of LEDs 104a-104n. In addition, any one or more of LED 104a-104n may be pulsed on and off at a high-frequency to control the effective brightness of the respective LED. When the number of enabled LEDs changes, the required output voltage VOUT to drive the enabled LEDs at the desired output current IOUT may change. As described in further detail below with reference to FIGS. 2A-9, a buck controller such as buck controller 46 may be configured to respond quickly to changes at the output, and thereby maintain regulation of the output current IOUT (and the resulting brightness of the enabled LEDs) at a desired level despite transient output voltage VOUT changes.

Figure 2A:
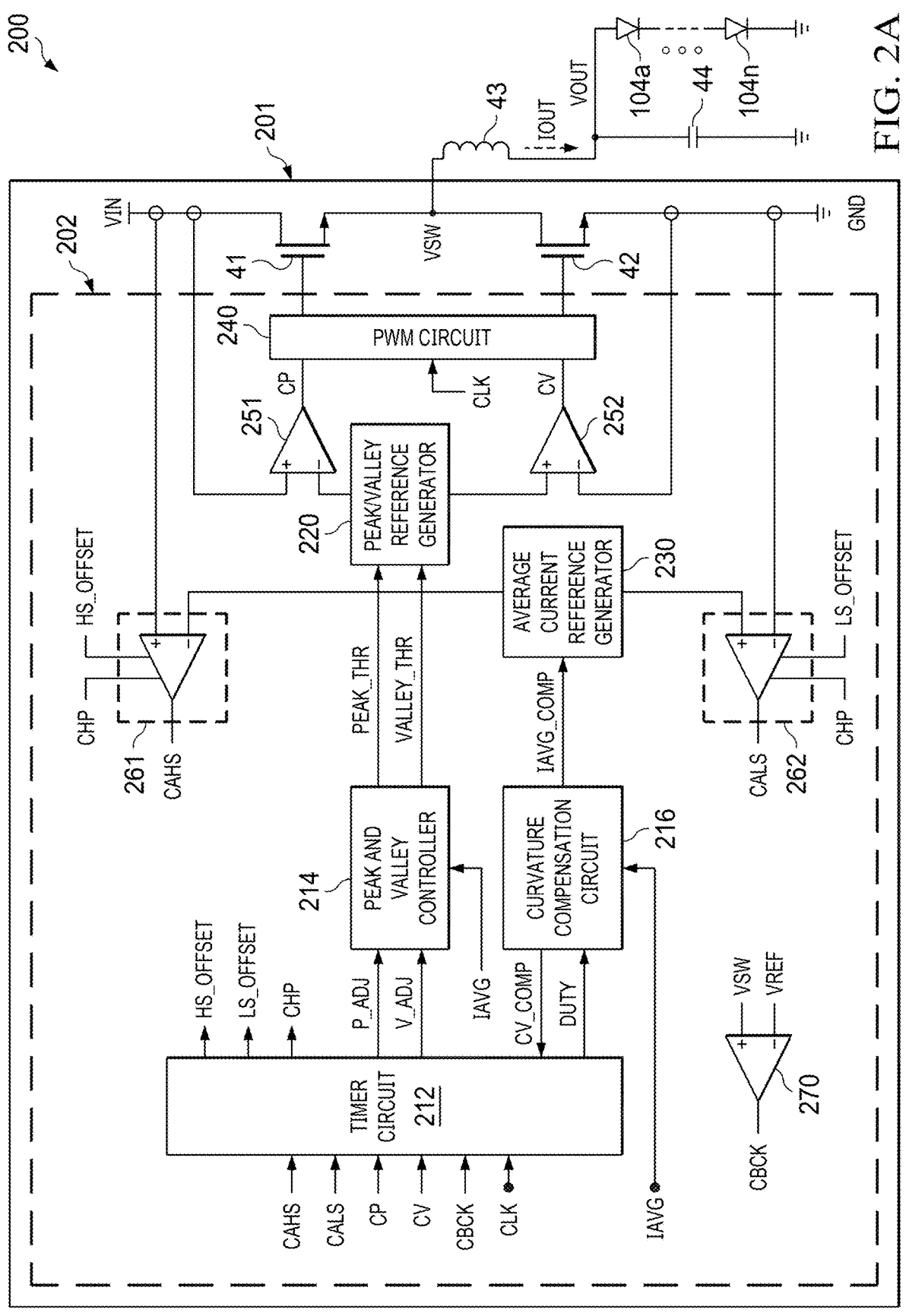
FIG. 2A illustrates a schematic diagram of an LED lighting system in accordance with embodiments of the present disclosure.

FIG. 2A illustrates a schematic diagram of LED lighting system 200 in accordance with embodiments of the present disclosure. LED lighting system 200 may be implemented in any suitable fashion according to the operation described in the present disclosure. As shown in FIG. 2A, LED lighting system 200 may include DC-DC converter circuit 201, inductor 43, output capacitor 44, as well as a plurality of LEDs 104a-104n. For the sake of simplicity, pixel controller 106 is omitted from FIG. 2A, but may also be included in LED lighting system 200 in a similar manner as described above with reference to FIG. 1.

DC-DC converter circuit 201 may be implemented in any suitable fashion according to the operation described in the present disclosure. DC-DC converter circuit 201 may represent an embodiment of buck controller 46 together with high-side transistor 41 and low-side transistor 42 as described above with reference to FIG. 1. As shown in FIG. 2A, DC-DC converter circuit 201 may include control circuit 202, high-side transistor 41, and low-side transistor 42. In some embodiments, high-side transistor 41 and low-side transistor 42 may be implemented in the same monolithic integrated circuit as other components of DC-DC converter circuit 201 included within control circuit 202. Thus, as illustrated in FIG. 2A, high-side transistor 41 and low-side transistor 42 may be considered part of DC-DC converter circuit 201 along with the other elements of DC-DC converter circuit 201 described herein. DC-DC converter circuit 201, including high-side transistor 41 and low-side transistor 42, along with inductor 43 and output capacitor 44 may form a DC-DC converter that may collectively serve as an embodiment of buck converter 40 described above with reference to FIG. 1. Inductor 43 may be coupled between the switching node VSW and an output of the DC-DC converter, while capacitor 44 may be coupled to the output of the DC-DC converter. In some embodiments, DC-DC converter circuit 201 may be utilized in an application to drive LEDs, and thus may also be referred to herein as an LED driver circuit. However, DC-DC converter circuit 201 is not limited to LED driver circuit applications and may be utilized in any other suitable DC-DC converter application to provide a regulated output current.

Control circuit 202 may be configured to drive high-side transistor 41 and low-side transistor 42 to regulate the average current of DC-DC converter circuit 201. As described below, control circuit 202 provide, for example, a hysteretic control over high-side transistor 41 and low-side transistor 42, whereby high-side transistor 41 and low-side transistor 42 are controlled in response to the high-side current and the low-side current crossing peak and valley thresholds respectively. Control circuit 202 may thus also be referred to as a hysteretic control circuit configured to drive high-side transistor 41 and low-side transistor 42 in response to the peak threshold and a valley threshold to regulate an average current of DC-DC converter circuit 201. In some embodiments, the switching frequency of high-side transistor 41 and low-side transistor 42 may be allowed to vary as a function of the hysteretic control. In other embodiments, control circuit 202 may include additional control features, that in addition to the hysteretic operation of control circuit 202, may control and/or limit the switching frequency to a desired range.

As shown in FIG. 2A, control circuit 202 may include timer circuit 212, peak-and-valley controller 214, curvature compensation circuit 216, peak-and-valley reference generator 220, average-current reference generator 230, pulse-width modulation (PWM) circuit 240, peak comparator 251, valley comparator 252, high-side comparator 261, low-side comparator 262, buck comparator 270, as well as high-side transistor 41 and low-side transistor 42.

High-side transistor 41 may be coupled between a first input supply node, such as VIN, and a switching node VSW. Low-side transistor 42 may be coupled between the switching node VSW, and a second input supply node, such as ground GND. High-side transistor 41 and low-side transistor 42 may be turned on and off to regulate the average output current IOUT of the buck converter.

PWM circuit 240 may be configured to receive a peak signal CP from peak comparator 251, receive a valley signal from valley comparator 252, and drive high-side transistor 41 and low side transistor 42 in response to the peak signal CP and the valley signal CV. For example, at the beginning of a switching cycle, PWM circuit 240 may drive high-side transistor 41 in an on-state and low-side transistor 42 in an off-state. During the on-time of high-side transistor 41, the high-side current through high-side transistor 41 and inductor 43 will rise. Peak comparator 251 may be configured to compare the high-side current through high-side transistor 41 against a peak threshold provided by peak-and-valley reference generator 220. When the high-side current reaches and crosses above the peak threshold, peak comparator 251 may assert a peak signal CP to instruct PWM circuit 240 to turn off high-side transistor 41 and to turn on low-side transistor 42. During the on-time of low-side transistor 42, the low-side current through inductor 43 and low-side transistor 42 may decrease from a value at or near the peak threshold. Valley comparator 252 may be configured to compare the low-side current through low-side transistor 42 against a valley threshold provided by peak-and-valley reference generator 220. When the low-side current reaches and crosses below the valley threshold, valley comparator 252 may assert a valley signal CV to instruct PWM circuit 240 to turn off low-side transistor 42 and to turn on high-side transistor 41 to start a new switching cycle.

DC-DC converter circuit 201 may regulate the average output current IOUT by setting the peak threshold and the valley threshold at respective levels that may be equal or similar magnitudes above and below the desired average current. For example, DC-DC converter circuit 201 may receive an average-current setting IAVG from the application in which DC-DC converter circuit 201 is implemented. Based on the average-current setting IAVG, peak-and-valley controller 214 may determine an initial peak-threshold setting PEAK_THR and an initial valley-threshold setting VALLEY_THR. The initial peak-threshold setting PEAK_THR and initial valley-threshold setting VALLEY_THR may be provided to peak-and-valley reference generator 220, which may in turn provide the peak threshold to peak comparator 251 and the valley threshold to valley comparator 252. As described in further detail below, the peak-threshold setting PEAK_THR and the valley-threshold setting VALLEY_THR may be further controlled according to inputs from timer circuit 212 to provide a fast and accurate regulation of the average output current IOUT.

To improve the accuracy of the control loop for DC-DC converter circuit 201, DC-DC converter circuit 201 may utilize high-side comparator 261 to continuously compare the high-side current during the on-time of high-side transistor 41 to an average-current threshold, as well as low-side comparator 262 to continuously compare the low-side current during the on-time of low-side transistor 42 to the average-current threshold. High-side comparator 261 may be configured to compare the high-side current against an average-current threshold and to generate a high-side comparison signal CAHS accordingly. Similarly, low-side comparator 262 may be configured to compare the low-side current against the average-current threshold and to generate a low-side comparison signal CALS accordingly. The high-side comparison signal CAHS and the low-side comparison signal CALS may be provided to timer circuit 212. As described in further detail below with reference to FIG. 2C and FIGS. 3A-3D, timer circuit 212 may utilize the high-side comparison signal CAHS and the low-side comparison signal CALS to adjust the peak-threshold setting PEAK-_THR and the valley-threshold setting VALLEY_THR, thereby maintaining accurate average current regulation.

In some embodiments, and as shown in FIG. 2A, timer circuit 212 may also receive a buck signal CBCK from buck comparator 270. Buck comparator 270 may compare the voltage at the switching node VSW against a reference VREF, which may equal for example one-half of VIN. The buck signal CBCK from buck comparator 270 may thus provide an indication to timer circuit 212 as to when high-side transistor 41 and low-side transistor 42 transition between respective on-states and off-states. As described below with reference to FIG. 2B, other techniques may also be utilized suitable to detect the transitions of high-side transistor 41 and low-side transistor 42 between respective on-states and off-states.

Figure 2B:
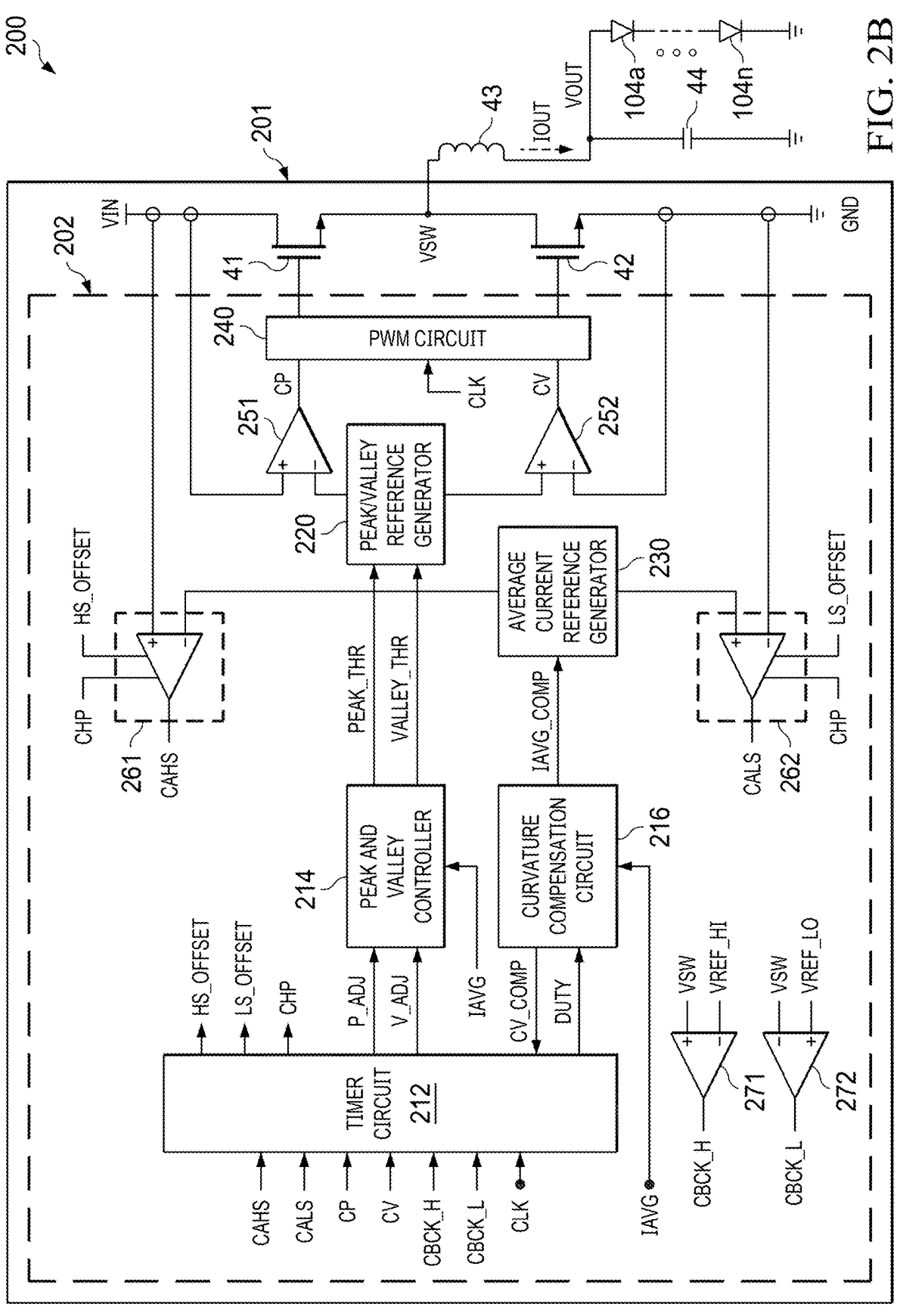
FIG. 2B illustrates a schematic diagram of an LED lighting system in accordance with embodiments of the present disclosure.

FIG. 2B illustrates a schematic diagram of LED lighting system 200 in accordance with embodiments of the present disclosure. As shown in FIG. 2B, comparator 271 and comparator 272 may be utilized in place of the instance of buck comparator 270 illustrated in FIG. 2A. Comparator 271 may compare the voltage at the switching node VSW against a reference VREF_HI, which may be for example ninety percent of VIN, and may generate a buck-high signal CBCK_H. Comparator 272 may compare the voltage at the switching node VSW against a reference VREF_LO, which may be for example ten percent of VIN, and may generate a buck-low signal CBCK_L. As shown in FIG. 2B, CBCK_H and CBCK_L may also be provided to timer circuit 212 in place of, or in addition to, the CBCK signal described above with reference to FIG. 2A as an indication to timer circuit 212 as to when high-side transistor 41 and low-side transistor 42 transition between respective on-states and off-states.

Figure 2C:
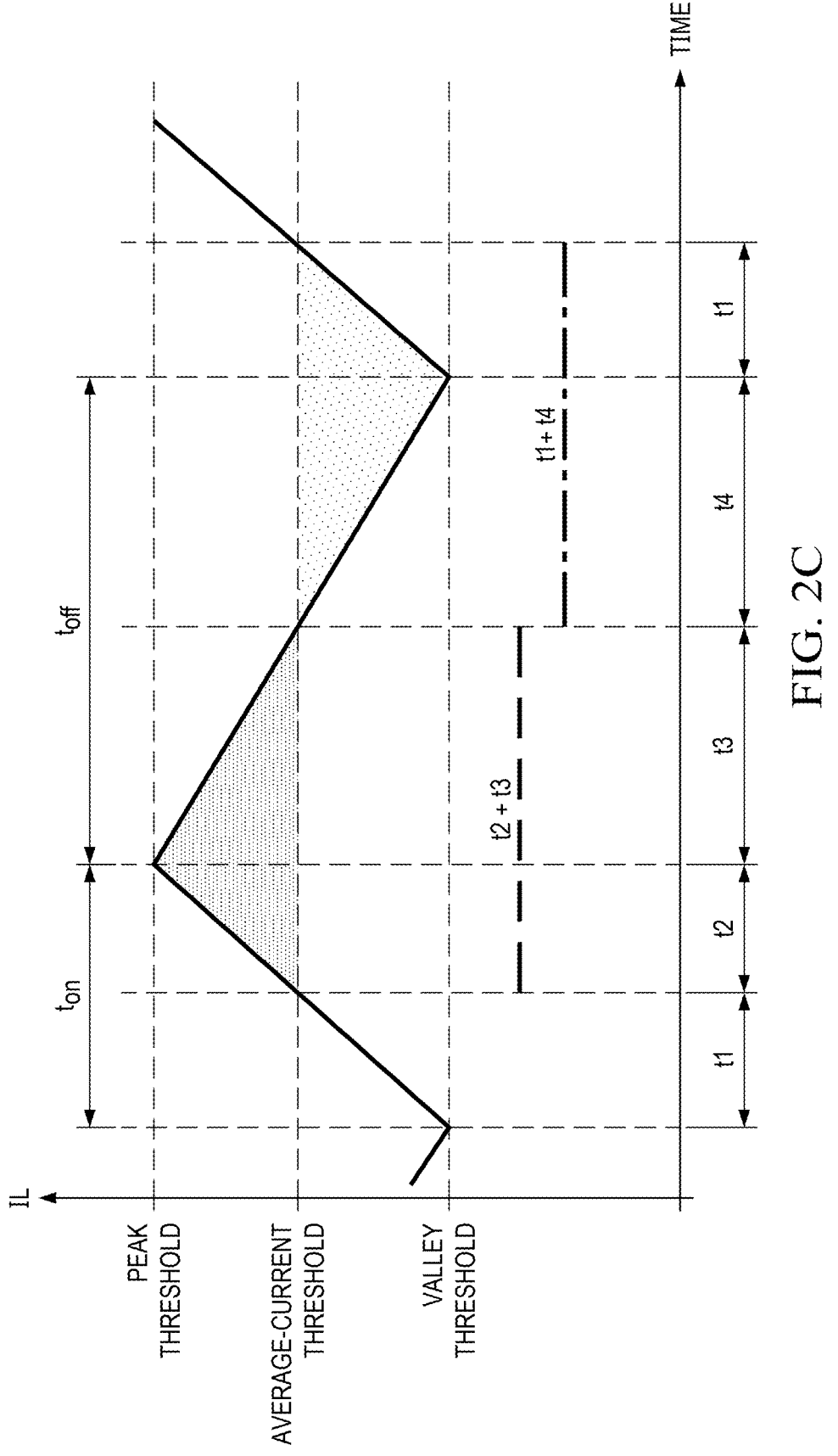
FIG. 2C illustrates a waveform of an inductor current signal in an LED lighting system in accordance with embodiments of the present disclosure.

FIG. 2C illustrates a waveform of an inductor current signal IL within LED lighting system 200 in accordance with embodiments of the present disclosure. The inductor current signal IL in FIG. 2C may represent the current through inductor 43 described above with reference to FIG. 2A. During the on-time ($t_{on}$) of high-side transistor 41, the rising high-side current flows through high-side transistor 41 and inductor 43. And during the off-time ($t_{off}$) of high-side transistor 41, when the low-side transistor is in an on-state, the falling low-side current flows through low-side transistor 42 and inductor 43. Thus, the rising portion of IL may represent the high-side current, and the falling portion of IL may represent the low-side current.

As shown in FIG. 2C, the time period during which the rising portion of IL (representative of the high-side current) is below the average-current threshold may be tabbed as time t1. And the time period during which the rising portion of IL (representative of the high-side current) is above the average-current threshold may be tabbed as time t2. Further, the time period during which the falling portion of IL (representative of the low-side current) is above the average-current threshold may be tabbed as time t3. And the time period during which the falling portion of IL (representative of the low-side current) is below the average-current threshold may be tabbed as time t4. Inventors of embodiments of the present disclosure have recognized that if the total time that IL is above the average-current threshold is equal to the total time that IL is below the average-current threshold, then the average output current IOUT may be equal to the average-current threshold. Accordingly, when the sum of t2 plus t3 is equal to the sum of t1 plus t4, the average output current IOUT may be equal to the average-current threshold set according to the desired average output current of the buck converter.

Returning to FIG. 2A, timer circuit 212 may calculate t1, t2, t3, and t4 based on, for example, a clock signal CLK, the high-side comparison signal CAHS, the low-side comparison signal CALS, as well as the peak signal CP and the valley signal CV, which may respectively indicate when high-side transistor 41 and low-side transistor 42 are in respective on-states and off-states. As described above, the valley signal CV may be asserted to instruct PWM circuit 240 to turn off low-side transistor 42 and to turn on high-side transistor 41. Thus, the valley signal CV may indicate to timer circuit 212 that high-side transistor 41 is in an on-state. In turn, timer circuit 212 may be configured to measure the first time period (t1) during which the high-side current is less than the average-current threshold, and to measure the second time period (t2) during which the high-side current is greater than the average-current threshold, based on the clock signal CLK and the high-side comparison signal CAHS. As also described above, the peak signal CP may be asserted to instruct PWM circuit 240 to turn off high-side transistor 41 and to turn on low-side transistor 42. Thus, the peak signal CP may indicate to timer circuit 212 that low-side transistor 42 is in an on-state. In turn, timer circuit 212 may be configured to measure the third time period (t3) during which the low-side current is greater than the average-current threshold, and to measure the fourth time period (t4) during which the low-side current is less than the average-current threshold, based on the clock signal CLK and the low-side comparison signal CALS.

Timer circuit 212 may also adjust the peak threshold and the valley threshold in response to the first time period (t1), second time period (t2), third time period (t3), and fourth time period (t4). Specifically, timer circuit 212 may be configured to adjust the peak threshold and the valley threshold based on a comparison of a sum of the first time period (t1) and the fourth time period (t4) against a sum of the second time period (t2) and the third time period (t3). For example, to the extent that the sum of t1 plus t4 differs from the sum of t2 plus t3, timer circuit 212 may provide a peak adjustment signal P_ADJ and/or a valley adjustment signal V_ADJ to peak-and-valley controller 214. In turn, peak-and-valley controller 214 may adjust one or both of the peak threshold setting PEAK_THR and the valley threshold setting VALLEY_THR provided to peak-and-valley reference generator 220, which provides the peak threshold and the valley threshold to peak comparator 251 and valley comparator 252 respectively. The adjustment to the peak threshold and/or the valley threshold may be targeted to bring the sum of t1 plus t4 in alignment with the sum of t2 plus t3, such that the average output current of the buck converter may accurately track the desired average output current.

Figure 3A:
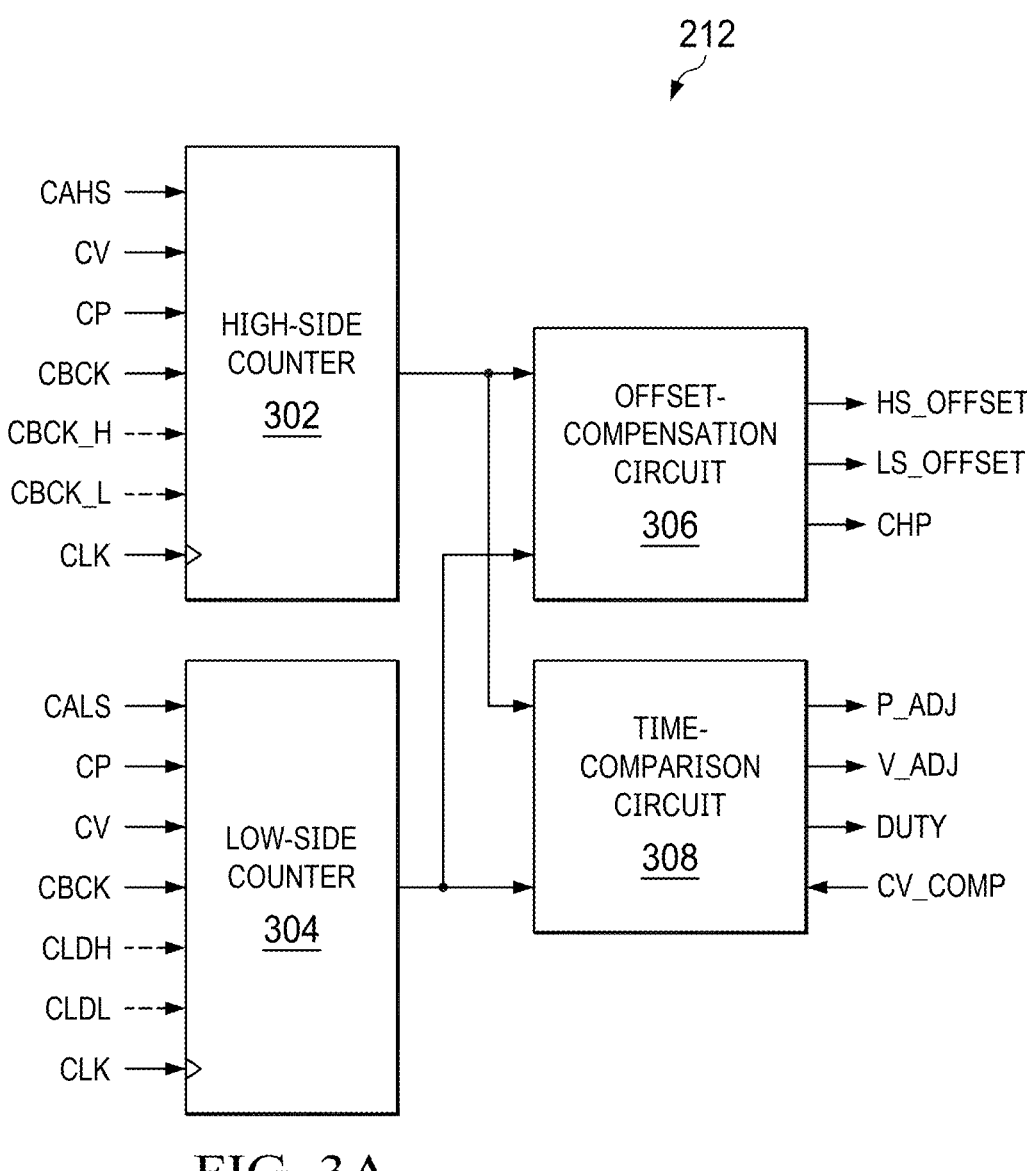
FIG. 3A illustrates a schematic diagram of a timer circuit in accordance with embodiments of the present disclosure.

FIG. 3A illustrates a schematic diagram of timer circuit 212 in accordance with embodiments of the present disclosure. Timer circuit 212 may be implemented in any suitable fashion according to the operation described in the present disclosure. In some embodiments, timer circuit 212 may include high-side counter 302, low-side counter 304, offset-compensation circuit 306, and time-comparison circuit 308.

High-side counter 302 may be implemented in any suitable fashion according to the operation described in the present disclosure. High-side counter 302 may be configured to measure the first time period (t1) and the second time period (t2) based on the high-side comparison signal CAHS and the clock signal CLK. For example, as shown in FIG. 3A, high-side counter 302 may be configured to receive the valley signal CV, the peak signal CP, as well as the high-side comparison signal CAHS and the clock signal CLK. As described above with reference to FIG. 2A, the valley signal CV may be asserted to instruct PWM circuit 240 to turn off low-side transistor 42 and to turn on high-side transistor 41. Further, the peak signal CP may be asserted to instruct PWM circuit 240 to turn off high-side transistor 41 and to turn on low-side transistor 42. Thus, the time between the assertion of the valley signal CV and the subsequent assertion of the peak signal CP may correspond to the on-time of high-side transistor 41. To measure the first time period (t1), high-side counter 302 may count the number of clock pulses when high-side comparison signal CAHS indicates that the high-side current is less than the average-current threshold in the time between the assertion of the valley signal CV and assertion of the peak signal CP. Likewise, to measure the second time period (t2), high-side counter 302 may count the number of clock pulses when high-side comparison signal CAHS indicates that the high-side current is greater than the average-current threshold in the time between the assertion of the valley signal CV and the subsequent assertion of the peak signal CP.

Low-side counter 304 may be implemented in any suitable fashion according to the operation described in the present disclosure. Low-side counter 304 may be configured to measure the third time period (t3) and the fourth time period (t4) based on the low-side comparison signal CALS and the clock signal CLK. For example, as shown in FIG. 3A, low-side counter 304 may be configured to receive the valley signal CV, the peak signal CP, as well as the low-side comparison signal CALS and the clock signal CLK. As described above with reference to FIG. 2A, the peak signal CP may be asserted to instruct PWM circuit 240 to turn off high-side transistor 41 and to turn on low-side transistor 42. Further, the valley signal CV may be asserted to instruct PWM circuit 240 to turn off low-side transistor 42 and to turn on high-side transistor 41. Thus, the time between the assertion of the peak signal CP and assertion of the valley signal CV may correspond to the on-time of low-side transistor 42 (and the off-time of high-side transistor 41). To measure the third time period (t3), low-side counter 304 may count the number of clock pulses when low-side comparison signal CALS indicates that the low-side current is greater than the average-current threshold in the time between the assertion of the peak signal CP and the subsequent assertion of the valley signal CV. Likewise, to measure the fourth time period (t4), low-side counter 304 may count the number of clock pulses when low-side comparison signal CALS indicates that the low-side current is less than the average-current threshold in the time between the assertion of the peak signal CP and the subsequent assertion of the valley signal CV.

The clock frequency of the clock signal CLK utilized by high-side counter 302 and low-side counter 304 may be greater than the switching frequency of high-side transistor 41 and low-side transistor 42, by a ratio of at least 10:1, for example. The higher the ratio of the clock frequency relative to the switching frequency, the higher the resolution of the adjustments that may be made to the peak threshold and the valley threshold according to the counts measured by high-side counter 302 and low-side counter 304. The clock signal CLK may thus be set to a clock frequency higher than the switching frequency of high-side transistor 41 and low-side transistor 42 by a ratio of at least 10:1, 20:1, 40:1, 100:1, 1000:1, or more.

Time-comparison circuit 308 may receive the respective counts for t1, t2, t3, and t4 from high-side counter 302 and low-side counter 304. The respective counts may represent the time values of the respective time periods. Time-comparison circuit 308 may then compare the sum of the first time period (t1) and the fourth time period (t4) against a sum of the second time period (t2) and the third time period (t3). Time-comparison circuit 308 of timer circuit 212 may in turn adjust the peak threshold and the valley threshold in response to the first time period (t1), second time period (t2), third time period (t3), and fourth time period (t4). Specifically, time-comparison circuit 308 may be configured to adjust the peak threshold and the valley threshold based on the comparison of a sum of the first time period (t1) and the fourth time period (t4) against a sum of the second time period (t2) and the third time period (t3). For example, to the extent that the sum of t1 plus t4 differs from the sum of t2 plus t3, time-comparison circuit 308 of timer circuit 212 may provide a peak adjustment signal P_ADJ and/or a valley adjustment signal V_ADJ to peak-and-valley controller 214. The adjustment to the peak threshold and/or the valley threshold may be targeted to bring the sum of t1 plus t4 in alignment with the sum of t2 plus t3, such that the average output current of the buck converter may accurately track the desired average output current.

As described above with reference to FIG. 2A, the peak signal CP may be asserted instruct PWM circuit 240 to turn off high-side transistor 41 and to turn on low-side transistor 42. Further, the valley signal CV may be asserted to instruct PWM circuit 240 turn off low-side transistor 42 and to turn on high-side transistor 41. For both transitions, there may be a delay between when CP or CV are asserted and when high-side transistor 41 and low-side transistor respectively turn on or off. The peak signal CP and the valley signal CV may nonetheless be utilized under certain conditions to indicate to high-side counter 302 and low-side counter 304 whether high-side transistor 41 or low-side transistor 42 are in the on-state. For example, to the extent that a delay from the assertion of the peak signal CP to the time that high-side transistor 41 turns off and low-side transistor 42 turns on causes an over-counting for t2 and an under-counting for t3, the associated errors may cancel during the summation of t2 and t3 by time-comparison circuit 308. Likewise, to the extent that a delay form the assertion of the valley signal CV to the time that low-side transistor 42 turns off and high-side transistor 41 turns on causes an over-counting for t4 and an under-counting for t1, the associated errors may cancel out during the summation of t1 and t4 by time-comparison circuit 308.

In some embodiments, high-side counter 302 and low-side counter 304 may respectively use a high-side blanking period and a low-side blanking period when determining the counts for t1 and t3. For example, when high-side transistor 41 turns on at the beginning of a switching cycle, the output of peak comparator 251 may be invalid for a period of time until the transistor is fully switched on and also until any transient noise spikes settle. To prevent errors during the turn-on time and/or due to transient noise spikes, timer circuit 212 may be configured to blank the high-side comparison signal CAHS during a high-side blanking period. For example, timer circuit 212, and high-side counter 302 in particular, may utilize a high-side blanking period during which high-side counter 302 ignores the high-side comparison signal CAHS. The high-side blanking period may begin, for example, in response to the valley signal CV that instructs PWM circuit 240 to turn off low-side transistor 42 and turn on high-side transistor 41. The duration of the high-side blanking period may thus be set to account not only for the delay within PWM circuit 240, but also for the expected settling time of the transient switching noise. During the high-side blanking period, high-side counter 302 may still count pulses of the clock signal CLK and assign those to the first time period t1 as the high-side current may be expected to be lower than the average-current threshold during the high-side blanking period.

Similarly, when high-side transistor 41 turns off and low-side transistor 42 turns on in the middle of a switching cycle, the output of valley comparator 252 may be invalid for a period of time until low-side transistor 42 is fully switched on and any transient noise spikes settle. To prevent errors during the turn on time and/or due to transient noise spikes, timer circuit 212 may be configured to blank the low-side comparison signal during a low-side blanking period. For example, timer circuit 212, and low-side counter 304 in particular, may utilize a low-side blanking period during which low-side counter 304 ignores the low-side comparison signal CALS. The low-side blanking period may begin, for example, in response to the peak signal CP that instructs PWM circuit 240 to turn off high-side transistor 41 and turn on low-side transistor 42. The duration of the low-side blanking period may be set to account not only for the delay within PWM circuit 240, but also for the expected settling time of the transient noise spikes. During the low-side blanking period, low-side counter 304 may still count pulses of the clock signal CLK and assign those to the third time period t3 as the low-side current may be expected to be higher than the average-current threshold during the low-side blanking period.

Figure 3B:
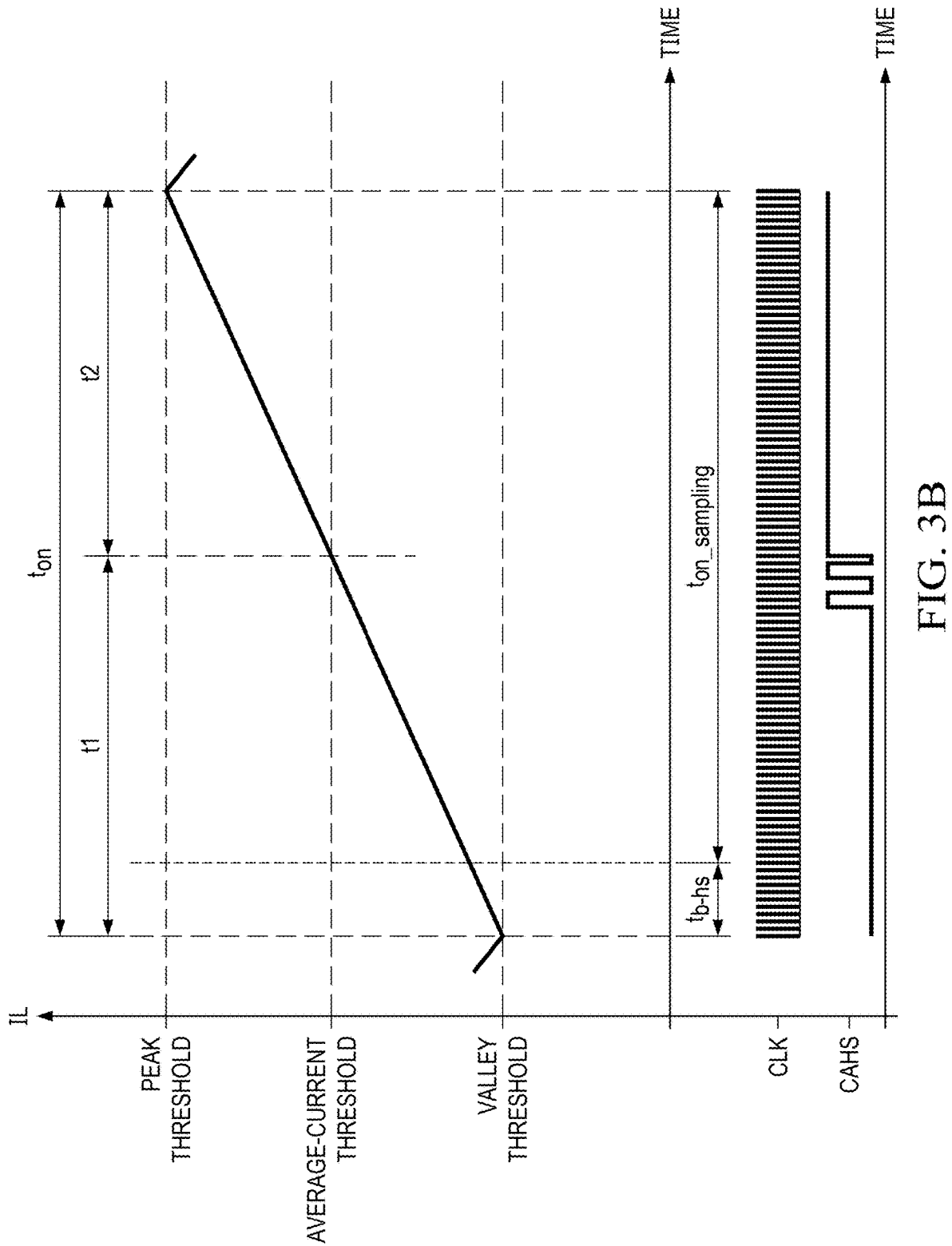
FIG. 3B illustrates waveforms of signals within an LED lighting system in accordance with embodiments of the present disclosure.

FIG. 3B illustrates waveforms of signals within LED lighting system 200 in accordance with embodiments of the present disclosure. Specifically, FIG. 3B illustrates inductor current IL during the on-time ($t_{on}$) of high-side transistor 41, as well as the clock signal CLK and the high-side comparison signal CAHS. As described above with reference to FIG. 3A, high-side counter may use a high-side blanking period ($t_{b\text{-}hs}$), during which the pulses of the clock signal CLK are counted and assigned to the first time period (t1). After the high-side blanking period ($t_{b\text{-}hs}$), a sampling time (ton_sampling) may commence during which the clock pulses may be counted and assigned to either the first time period (t1) or the second time period (t2) depending on the state of the high-side comparison signal CAHS. Further clock pulses counted after the blanking period but before the high-side current crosses the average-current threshold may be added to the count for the first time period (t1). Subsequently, after the high-side current crosses the average-current threshold, the remainder of pulses of the clock signal CLK during the on-time of the high-side transistor 41 may be counted and assigned to the second time period (t2).

In some embodiments, noise at the input of high-side comparator 261 may cause a flickering of the high-side comparison signal CAHS when the high-side current is close to the average-current threshold. Nonetheless, the counting of the pulses of the clock signal CLK, and the assignment of those pulses to either the first time period (t1) or the second time period (t2) based on the high-side comparison signal, may provide a time-based averaging of error caused by noise at the input of high-side comparator 261. Although not illustrated in FIG. 3B, noise at the input of low-side comparator 262 may cause a similar flickering of the low-side comparison signal CALS with the low-side current is close to the average current threshold. And in a similar manner as described directly above for high-side comparator 261, the counting of the pulses of the clock signal CLK, and the assignment of those pulses to either the third time period (t3) or the fourth time period (t4) based on the low-side comparison signal, may provide a time-based averaging of error caused by noise at the input of low-side comparator 262.

Figure 3C:
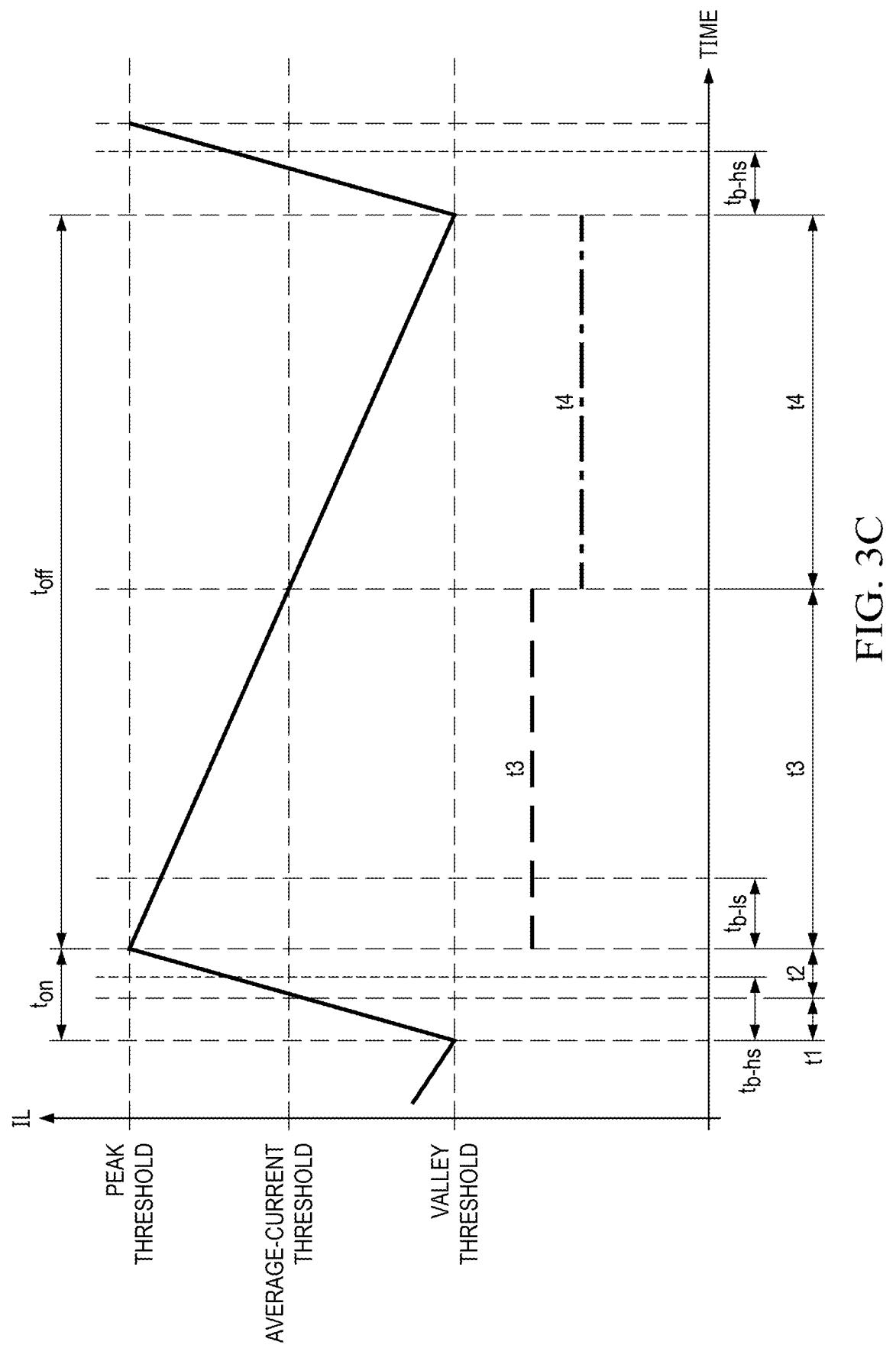
FIGS. 3C and 3D illustrate waveforms of an inductor current signal in an LED lighting system in accordance with embodiments of the present disclosure.
Figure 3D:
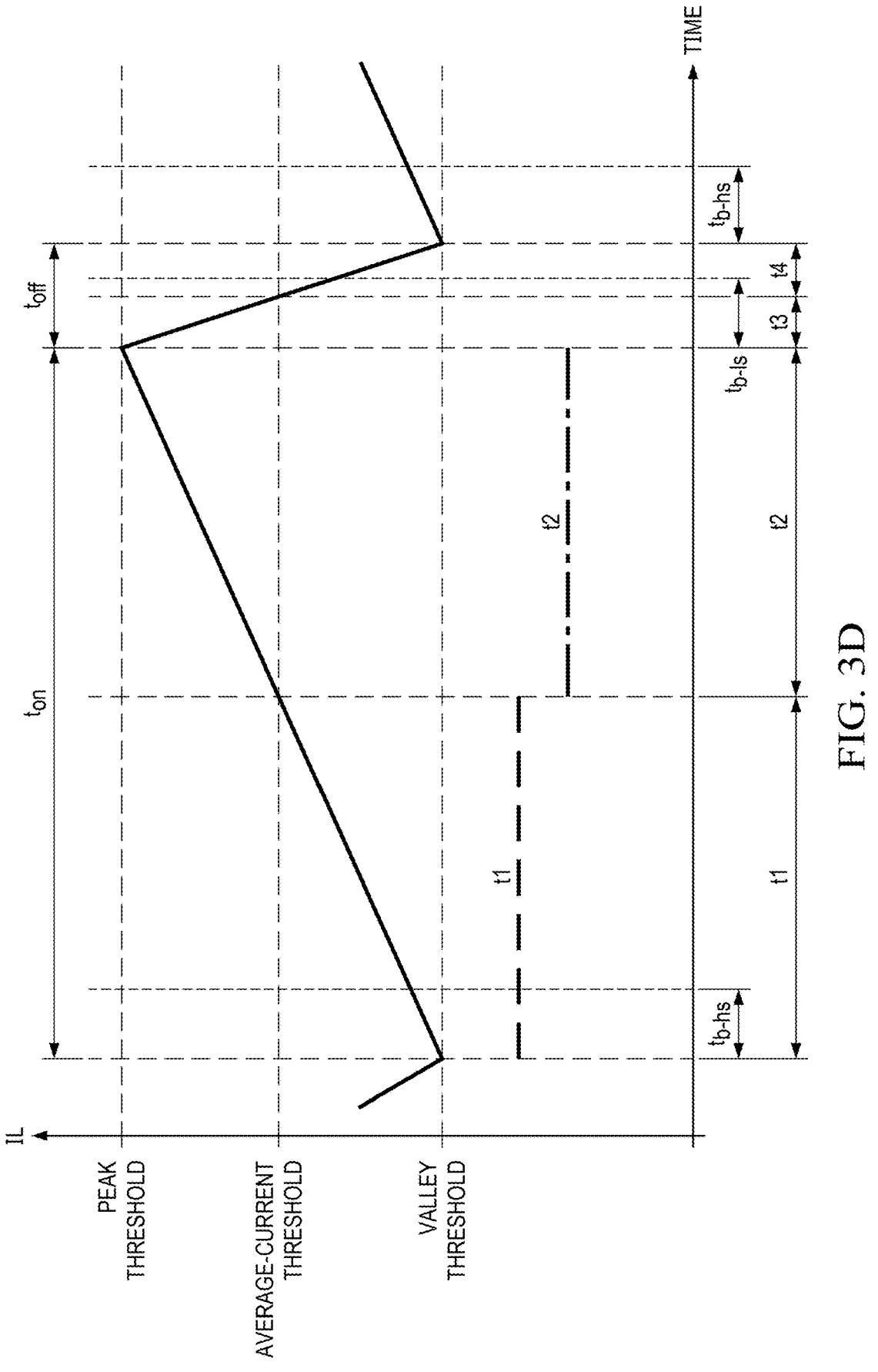

FIGS. 3C and 3D illustrate waveforms of an inductor current signal IL within LED lighting system 200 in accordance with embodiments of the present disclosure. The inductor current signal IL in FIG. 3C may represent the current through inductor 43 described above with reference to FIG. 2A. During the on-time ($t_{on}$) of high-side transistor 41, the rising high-side current flows through high-side transistor 41 and inductor 43. And during the off-time ($t_{off}$) of high-side transistor 41, when the low-side transistor is in an on-state, the falling low-side current flows through low-side transistor 42 and inductor 43. Thus, the rising portion of IL may represent the high-side current, and the falling portion of IL may represent the low-side current.

For the purposes of the present disclosure, the duty cycle of a transistor, such as high-side transistor 41 or low-side transistor 42, may refer to the ratio of the on-time ($t_{on}$) to the sum of the on-time and the off-time ($t_{on}+t_{off}$) for a given on-and-off switching cycle of that transistor. FIG. 3C illustrates the inductor current signal IL in a operating condition where the duty cycle of high-side transistor 41 is very low. As shown in FIG. 3C, when the duty cycle is very low, the high-side blanking period $t_{b\text{-}hs}$ may be greater than the first time period (t1) during which the high-side current is less than the average-current threshold. Under such conditions, timer circuit 212 may ignore the counts for the first time period (t1) and the second time period (t2), and instead perform a comparison directly between the counts for the third time period (t3) and the fourth time period (t4). For example, timer circuit 212, including time-comparison circuit 308 in particular, may be configured to adjust the peak threshold and the valley threshold in a similar manner as described above, but based on a comparison of the third time period (t3) and the fourth time period (t4) when the first time period (t1) is less than the high-side blanking period $t_{b\text{-}hs}$. Under such conditions, the third time period (t3) and the fourth time period (t4) may represent a large majority of the overall switching cycle. Thus, comparison for the third time period (t3) and the fourth time period (t4) may provide for an accurate detection of the average current under such duty cycle conditions where the high-side blanking period $t_{b\text{-}hs}$ is greater than the first time period (t1).

As shown in FIG. 3D, when the duty cycle is very high, the low-side blanking period $t_{b\text{-}ls}$ may be greater than the third time period (t3) during which the low-side current is greater than the average-current threshold. Under such conditions, timer circuit 212 may ignore the counts for the third time period (t3) and the fourth time period (t4), and instead perform a comparison directly between the counts for the first time period (t1) and the second time period (t2). For example, timer circuit 212, including time-comparison circuit 308 in particular, may be configured to adjust the peak threshold and the valley threshold in a similar manner as described above, but based on a comparison of the first time period (t1) and the second time period (t2) when the third time period (t3) is less than the low-side blanking period $t_{b\text{-}ls}$. Under such conditions, the first time period (t1) and the second time period (t2) may represent a large majority of the overall switching cycle. Thus, comparison of the first time period (t1) and the second time period (t2) may provide for an accurate detection of the average current under such duty cycle conditions where the low-side blanking period $(t_{b-ls})$ is greater than the third time period (t3).

When comparing the third time period (t3) against the fourth time period (t4) during low duty cycle conditions as described above with reference to FIG. 3C, or when comparing the first time period (t1) against the second time period (t2) during high duty cycle conditions as described above with reference to FIG. 3D, the measurements of the individual time periods may benefit from an accurate determination of when high-side transistor 41 and low-side transistor 42 turn on and off. Thus, in some embodiments, timer circuit 212, and in particular high-side counter 302 and low-side counter 304, may utilize the CBCK signal from buck comparator 270. As described above with reference to FIG. 2A, buck comparator 270 may compare the voltage at the switching node against a reference voltage, for example set to one-half of VIN, and may thus provide an accurate determination of when high-side transistor 41 and low-side transistor 42 transition between respective on-states and off-states opposite to each other.

In other embodiments, timer circuit 212, and in particular high-side counter 302 and low-side counter 304, may utilize the CBCK_H and CBCK_L signals from comparator 271 and comparator 272 described above with reference to FIG. 2B. As described above with reference to FIG. 2B, comparator 271 may compare the voltage at the switching node VSW against a reference VREF_HI, which may be for example ninety percent of VIN, and may generate a buck-high signal CBCK_H. Comparator 272 may compare the voltage at the switching node VSW against a reference VREF_LO, which may be for example ten percent of VIN, and may generate a buck-low signal CBCK_L. During a low-to-high or high-to-low transition of VSW due to the switching on and off of high-side transistor 41 and low-side transistor 42 respectively, timer circuit 212 may receive the CBCK_L and CBCK_H signal and may tab the half-way point between the respective transitions of CBCK_L and CBCK_H as the time for when high-side transistor 41 and low-side transistor 42 transition between respective on-states and off-states opposite to each other.

Figure 4A:
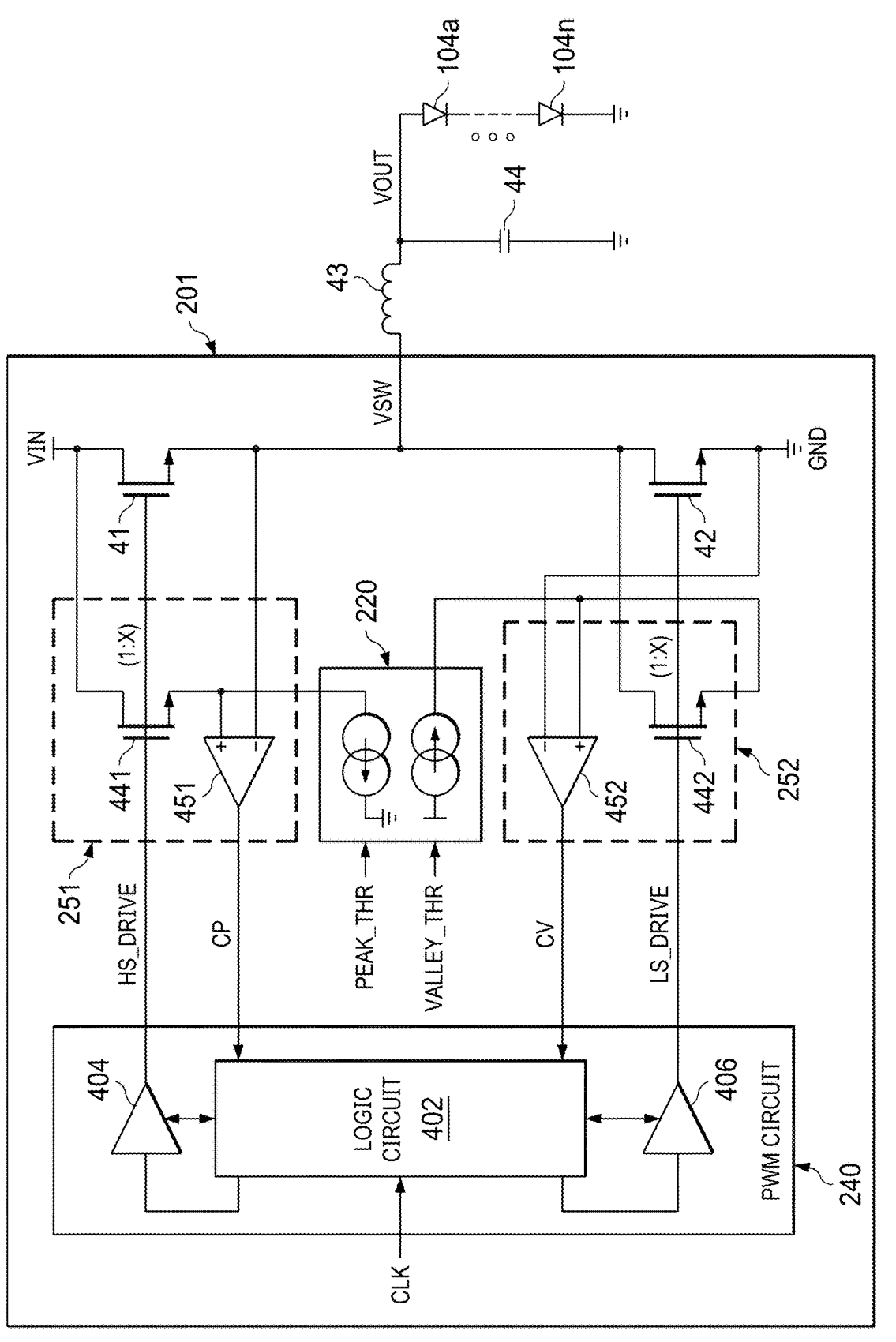
FIG. 4A illustrates a schematic diagram for portions of a DC-DC converter circuit in accordance with embodiments of the present disclosure.

FIG. 4A illustrates a schematic diagram for portions of DC-DC converter circuit 201 in accordance with embodiments of the present disclosure. Specifically, FIG. 4A illustrates additional details of peak-and-valley reference generator 220, PWM circuit 240, peak comparator 251, and valley comparator 252.

As described above with reference to FIG. 2A, peak-and-valley reference generator 220 may receive the peak-threshold setting PEAK_THR and the valley-threshold setting VALLEY_THR from peak-and-valley controller 214. As shown in FIG. 4A, peak-and-valley reference generator 220 may provide the peak threshold to peak comparator 251 in the form of a reference current proportional to the peak threshold. Similarly, peak-and-valley reference generator 220 may provide the valley threshold to valley comparator 252 in the form of a reference current proportional to the valley threshold.

Peak comparator 251 may be implemented in any suitable fashion according to the operation described in the present disclosure. In some embodiments, peak comparator 251 may be implemented with high-side sense transistor 441 and voltage comparator 451. In some embodiments, high-side sense transistor 441 may be configured as an NMOS sense FET for high-side transistor 41, with a drain coupled to the drain of high-side transistor 41, a gate coupled to the gate of high-side transistor 41, and a source coupled to peak-and-valley reference generator 220 to receive the sink current signal proportional to the peak threshold. High-side sense transistor 441 may be configured to have a size that is smaller than high-side transistor 41. For example, high-side sense transistor 441 may be configured to have a size that is smaller than high-side transistor 41 by a ratio of 1:100, 1:1000, 1:2000, 1:4000, 1:10000, or greater. In some embodiments, high-side sense transistor 441 may be implemented, for example, by one finger of a multiple-finger layout for high-side transistor 41. Accordingly, high-side sense transistor 441 may match high-side transistor 41 at the designed ratio.

In some embodiments, the reference current provided by peak-and-valley reference generator 220 may have the same ratio relative to the peak threshold as the respective sizes for high-side sense transistor 441 and high-side transistor 41. Accordingly, the drain-to-source voltage drop across high-side sense transistor 441 due to the reference current may equal the voltage drop across high-side transistor 41 at the peak threshold. Thus, as shown in FIG. 4A, voltage comparator 451 may compare the voltages at the respective sources of high-side sense transistor 441 and high-side transistor 41 to generate the peak signal CP. For example, when the high-side current through high-side transistor 41 exceeds the peak threshold, the voltage at the source of high-side transistor 41 may cross below the voltage at the source of high-side sense transistor 441, and voltage comparator 451 may thus assert the peak signal CP.

Valley comparator 252 may be implemented in any suitable fashion according to the operation described in the present disclosure. In some embodiments, valley comparator 252 may be implemented with low-side sense transistor 442 and voltage comparator 452. In some embodiments, low-side sense transistor 442 may be configured as an NMOS sense FET for low-side transistor 42. For example, as shown in FIG. 4A, low-side sense transistor 442 may have a gate coupled to the gate of low-side transistor 42, a drain coupled to the drain of low-side transistor 42, and a source coupled to peak-and-valley reference generator 220 to receive the reference current proportional to the valley threshold. Low-side sense transistor 442 may be configured to have a size that is smaller than low-side transistor 42. For example, low-side sense transistor 442 may be configured to have a size that is smaller than low-side transistor 42 by a ratio of 1:100, 1:1000, 1:2000, 1:4000, 1:10000, or greater. In some embodiments, low-side sense transistor 442 may be implemented, for example, by one finger of a multiple-finger layout for low-side transistor 42. Accordingly, low-side sense transistor 442 may match low-side transistor 42 at the designed ratio.

In some embodiments, the reference current provided by peak-and-valley reference generator 220 may have the same ratio relative to the valley threshold as the respective sizes for low-side sense transistor 442 and low-side transistor 42. Accordingly, the drain-to-source voltage drop across low-side sense transistor 442 due to the reference current may equal the voltage drop across low-side transistor 42 at the peak threshold. Thus, as shown in FIG. 4A, voltage comparator 452 may compare the voltages at the respective sources of low-side sense transistor 442 and low-side transistor 42 to generate the valley signal CV. For example, when the low-side current through low-side transistor 42 drops below the valley threshold, the voltage at the source of low-side transistor 42 may cross below the voltage at the source of low-side sense transistor 442, and voltage comparator 452 may thus assert the valley signal CV.

As described above, high-side sense transistor 441 and low-side sense transistor 442 may be implemented as sense FETs for the respective high-side transistor 41 and low-side transistor 42. Accordingly, the current through high-side transistor 41 and low-side transistor 42 may be measured without adding an additional resistive element, such as a sense resistor, in the high-side or low-side current path. High-side sense transistor 441 and low-side sense transistor 442 may thus avoid efficiency loss and heat generation that would otherwise be associated with using sense resistors in the high-side and low-side current paths to detect the high-side and low-side currents.

Although the embodiments above describe high-side sense transistor 441 and low-side sense transistor 442 as NMOS sense FETs, high-side sense transistor 441 and low-side sense transistor 442 may be implemented with any suitable transistor type to match the respective high-side transistor 41 and low-side transistor 42. For example, in embodiments where high-side transistor 41 is implemented with a PMOS transistor, high-side sense transistor 441 may likewise be implemented as a PMOS sense FET.

PWM circuit 240 may be implemented in any suitable fashion according to the operation described in the present disclosure. PWM circuit may commute control of high-side transistor 41 and low-side transistor 42. In some embodiments, PWM circuit 240 may include high-side driver 404, low-side driver 406, as well as logic circuit 402. At the beginning of a switching cycle, PWM circuit 240 may drive high-side transistor 41 in an on-state and low-side transistor 42 in an off-state. For example, in response to an assertion of the valley signal CV, logic circuit 402 may control high-side driver 404 to drive high-side transistor 41 in an on-state, and may control low-side driver 406 to drive low-side transistor 42 in an off-state. Logic circuit 402 may include non-overlap logic to ensure that low-side transistor 42 is turned off before high-side transistor 41 is turned on to prevent any shoot-through current from VIN to ground GND. When the high-side current reaches and crosses above the peak threshold, peak comparator 251 may assert the peak signal CP to instruct PWM circuit 240 to turn off high-side transistor 41 and to turn on low-side transistor 42. For example, in response to an assertion of the peak signal CP, logic circuit 402 may control low-side driver 406 to drive low-side transistor 42 in an on-state, and may control high-side driver 404 to drive high-side transistor 41 in an off-state. Logic circuit 402 may include non-overlap logic to ensure that high-side transistor 41 is turned off before low-side transistor 42 is turned on to prevent any shoot-through current from VIN to ground GND.

In some embodiments, PWM circuit 240, and in particular the logic circuit 402 of PWM circuit 240, may include a digital filter configured to digitally filter the peak signal CP from peak comparator 251 and to digitally filter the valley signal CV from valley comparator 252. For example, as shown in FIG. 4A, PWM circuit 240 and logic circuit 402 in particular may receive a clock signal CLK. The digital filter may require that the peak signal CP be asserted for two, three, four, or any suitable N number of clock cycles before PWM circuit 240 turns off high-side transistor 41 and turns on low-side transistor 42. For example, the digital filter may require that the peak signal CP be asserted for two, three, four, or any suitable N number of consecutive clock cycles before PWM circuit 240 turns off high-side transistor 41 and turns on low-side transistor 42. Similarly, the digital filter may require that the valley signal CV be asserted for two, three, four, or any suitable N number of clock cycles before PWM circuit 240 turns off low-side transistor 42 and turns on high-side transistor 41. By filtering the peak signal CP and/or the valley signal CV, PWM circuit 240 may prevent noise incurred at the inputs of peak comparator 251 and valley comparator 252 from improperly triggering PWM circuit 240 to change the respective on-state or off-state of high-side transistor 41 and low-side transistor 42 before the peak threshold or valley threshold have been reached. Such filtering may cause the high-side current to overshoot above the set peak threshold, and similarly cause the low-side current to undershoot below the set valley threshold. Nonetheless, such overshoot and/or undershoot may be fully compensated by the average current regulation loop as a whole and may thus have either no impact, or only a minimal impact, on the required average output current.

Figure 4B:
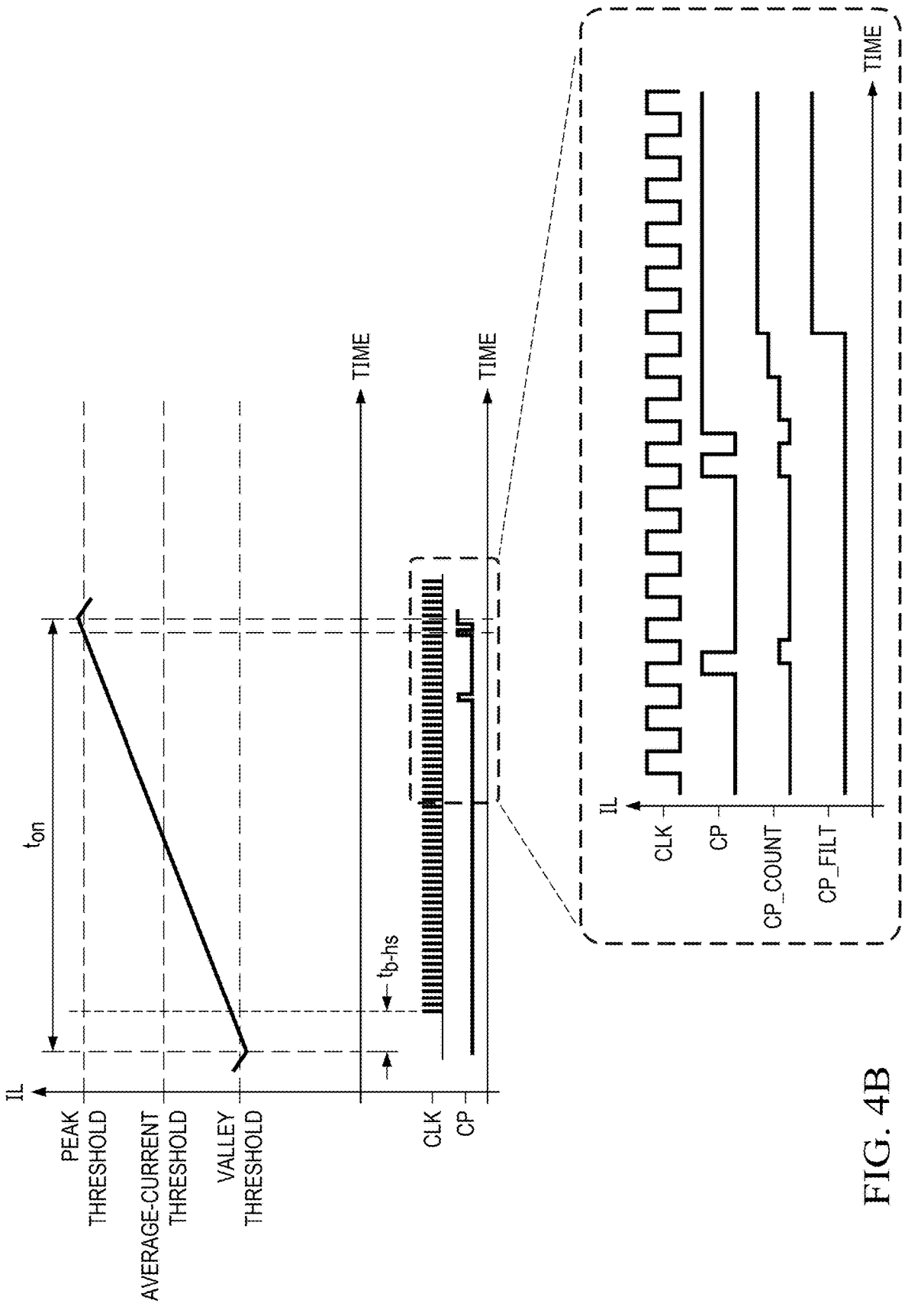
FIG. 4B illustrates waveforms of signals within an LED lighting system in accordance with embodiments of the present disclosure.

FIG. 4B illustrates waveforms of signals within an LED lighting system in accordance with embodiments of the present disclosure. Specifically, FIG. 4B illustrates how logic circuit 402 within PWM circuit 240 may digitally filter the peak signal CP, and similarly the valley signal CV. The inductor current signal IL in FIG. 4B may represent the current through inductor 43 described above with reference to FIG. 2A. During the on-time ($t_{on}$) of high-side transistor 41, the rising high-side current flows through high-side transistor 41 and inductor 43. Thus, the rising portion of IL may represent the high-side current.

As shown in FIG. 4B, logic circuit 402 may generate a peak-signal count CP_COUNT in response to the peak signal CP and the clock signal CLK. The peak-signal count CP_COUNT may increase by one for every clock pulse, triggered by either the rising edge and/or the falling edge of the clock signal CLK, during which the peak signal CP is asserted at a logic-high value. The peak-signal count CP_COUNT may also be reset to zero if the peak signal CP is unasserted at a logic-low value. In turn, the filtered peak signal CP_FILT may be asserted only when the peak-signal count CP_COUNT reaches a set value, of for example, two, three, four, or any suitable number N. Accordingly, as shown in FIG. 4B, disturbances in the peak signal CP prior to the inductor current IL reaching the peak threshold may be filtered out. Although not expressly shown in FIG. 4B, logic circuit 402 may also digitally filter the valley signal CV in the same manner as described above and as shown in FIG. 4B.

Figure 4C:
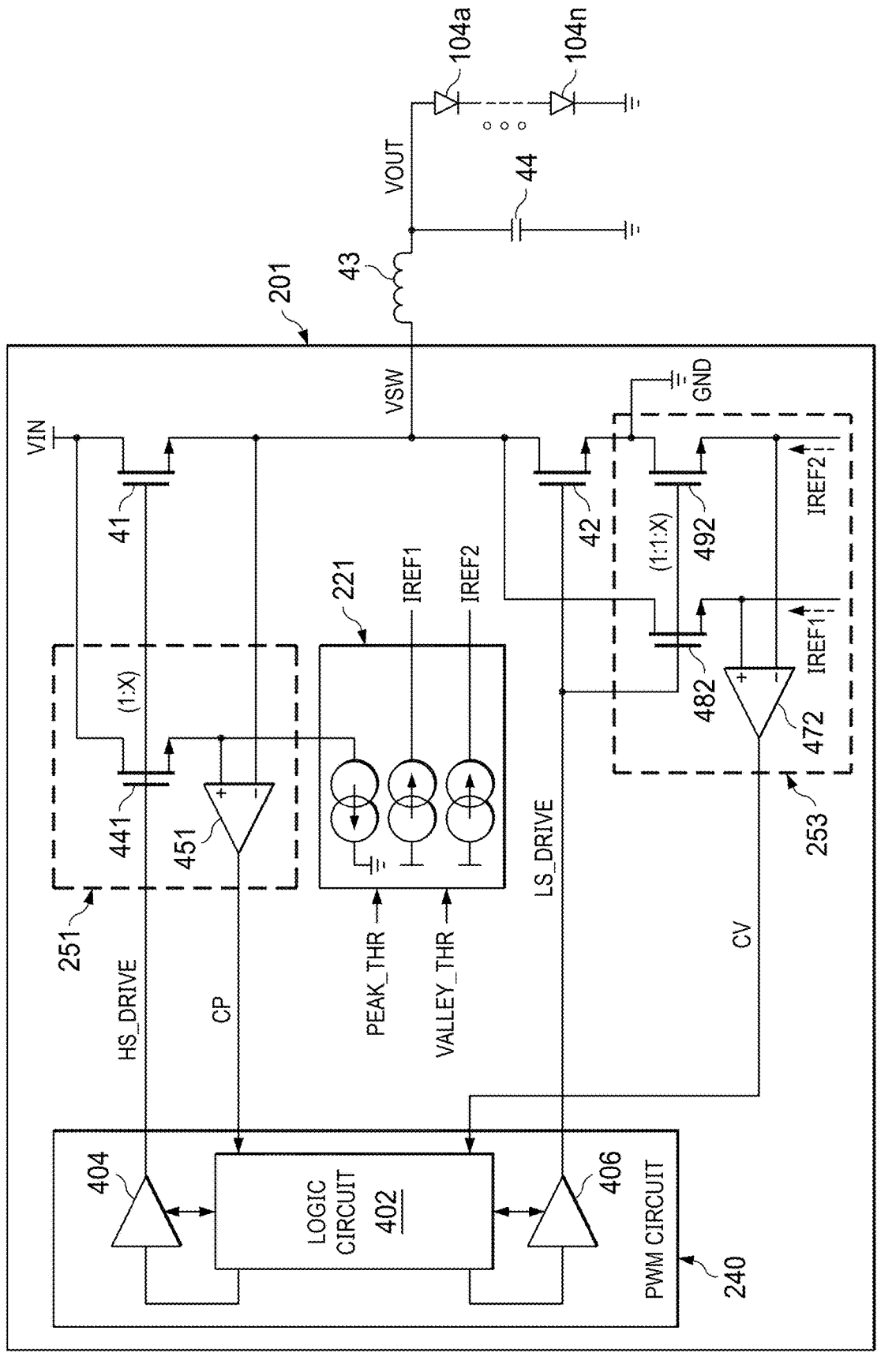
FIG. 4C illustrates a schematic diagram for portions of a DC-DC converter circuit in accordance with embodiments of the present disclosure.

FIG. 4C illustrates a schematic diagram for portions of DC-DC converter circuit 201 in accordance with embodiments of the present disclosure. Similar to FIG. 4A, FIG. 4C illustrates additional details of PWM circuit 240 and peak comparator 251, both of which may operate in a similar manner as described above with reference to FIG. 4A. In addition, FIG. 4C illustrates additional details of peak-and-valley reference generator 221 and valley comparator 253, which may serve as alternative embodiments for peak-and-valley reference generator 220 and valley comparator 252 described above with reference to FIG. 4A.

In some applications of the LED lighting system 200, the magnitude of the ripple of the inductor current IL may exceed the average output current. In such applications, the inductor current IL may reverse and go negative during a portion of the off-time of high-side transistor 41 when low-side transistor 42 is in an on-state. To accommodate such applications, peak-and-valley reference generator 221 and valley comparator 253 may be configured to compare the valley threshold against a negative current.

As shown in FIG. 4C, valley comparator 253 may include sense transistor 492, sense transistor 482, and voltage comparator 472. Sense transistor 482 may be an NMOS transistor with a gate and a drain coupled to the respective gate and drain of low-side transistor 42, and a source coupled to receive a reference current IREF1 from peak-and-valley reference generator 221. Sense transistor 492 may be an NMOS transistor with a gate coupled to the gate of low-side transistor 42, a drain coupled to ground GND, and a source coupled to receive a reference current IREF2 from peak-and-valley reference generator 221. Sense transistor 482 and sense transistor 492 may be configured to have the same size as each other, and to both have a size that is smaller than low-side transistor 42 by a ratio of 1:100, 1:1000, 1:2000, 1:4000, 1:10000, or greater. Voltage comparator 472 may have a first input coupled to the source of sense transistor 482 and a second input coupled to the source of sense transistor 492.

To sense positive currents, IREF1 may be set to a value proportional to the valley threshold and IREF2 may be set to zero. With IREF2 at zero, the voltage drop across the drain to source of sense transistor 492 may equal zero. Thus, by comparing the voltages at the respective sources of sense transistor 482 and sense transistor 492, voltage comparator 472 may effectively compare the voltage drops across sense transistor 482 due to IREF1 against the voltage drop across low-side transistor 42 due to the low-side current. For example, when the low-side current through low-side transistor 42 drops below the valley threshold, the voltage at the source of low-side transistor 42 (and at the source of sense transistor 492) may cross below the voltage at the source of sense transistor 482, and voltage comparator 472 may thus assert the valley signal CV.

To sense reverse currents, IREF1 may be set to zero and the IREF2 may be set to a value proportional to the valley threshold. With IREF1 at zero, the voltage drop across sense transistor 482 may equal zero. Thus, by comparing the voltages at the respective sources of sense transistor 482 and sense transistor 492, voltage comparator 472 may effectively compare the voltage drops across sense transistor 492 due to IREF2 against the voltage drop across low-side transistor 42 due to the negative low-side current flowing from drain to source to low-side transistor 42. For example, when the low-side current through low-side transistor 42 drops below the valley threshold, the voltage at the drain of low-side transistor 42 (and thus at the source of sense transistor 482) may cross above the voltage at the source of sense transistor 492, and voltage comparator 472 may thus assert the valley signal CV.

Figure 5A:
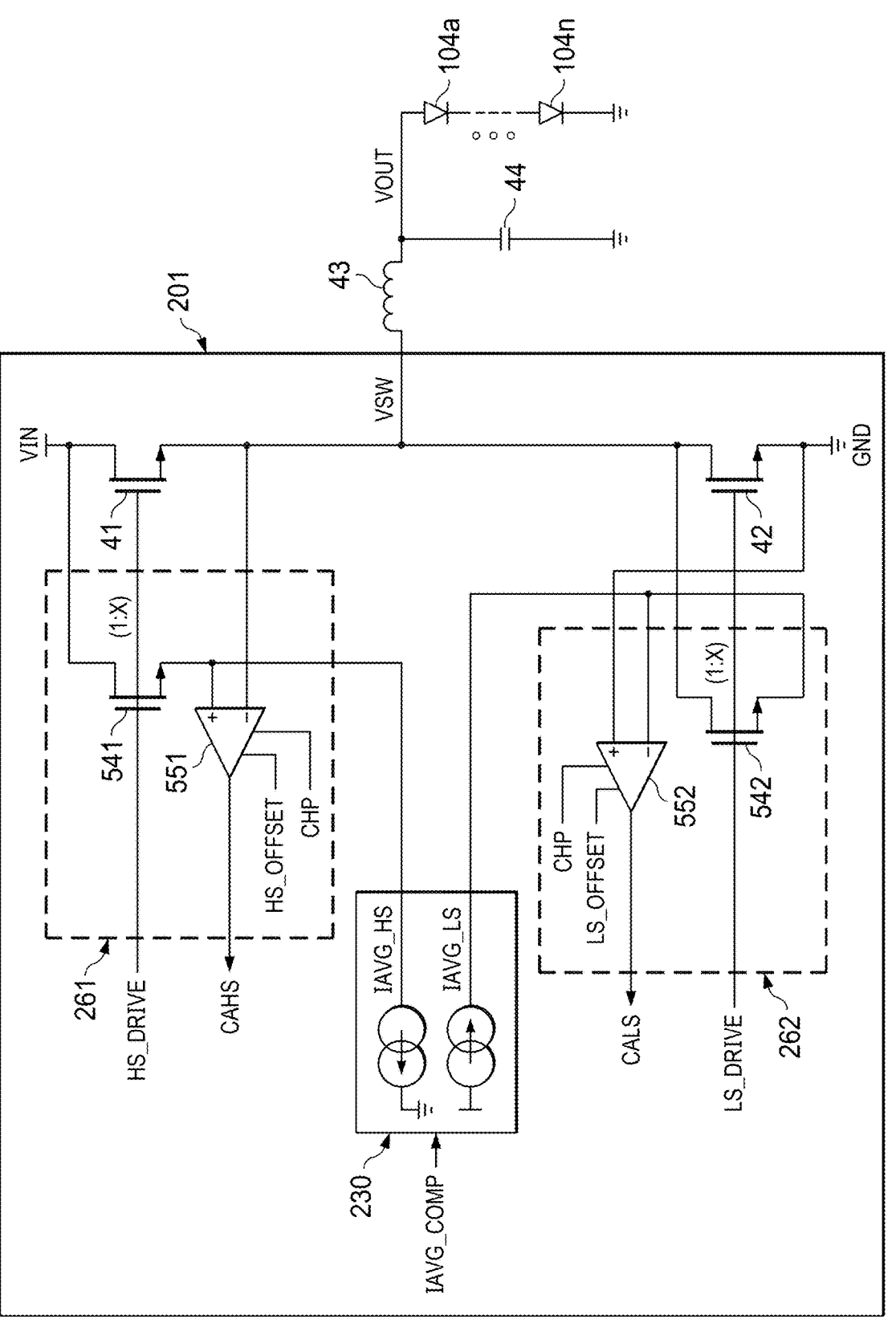
FIG. 5A illustrates a schematic diagram for portions of a DC-DC converter circuit in accordance with embodiments of the present disclosure.

FIG. 5A illustrates a schematic diagram for portions of DC-DC converter circuit 201 in accordance with embodiments of the present disclosure. Specifically, FIG. 5A illustrates additional details of average-current reference generator 230, high-side comparator 261, and low-side comparator 262.

As shown in FIG. 2A, average-current reference generator 230 may receive a compensated average-current threshold IAVG_COMP from curvature compensation controller 215. The curvature compensation applied to the average current setting IAVG by curvature compensation controller 215 is described in further detail below with reference to FIG. 8. But for the purposes of describing the operation of high-side comparator 261 and low-side comparator 262, the compensated average-current threshold IAVG_COMP may represent a compensated version of the average current setting IAVG provided to DC-DC converter circuit 201.

As shown in FIG. 5A, average-current reference generator 230 may provide the average current threshold to high-side comparator 261 in the form of a high-side average current reference IAVG_HS proportional to the average current threshold. Similarly, average-current reference generator

230 may provide the average current threshold to low-side comparator 262 in the form of a low-side average current reference IAVG_LS proportional to the average current threshold.

High-side comparator 261 may be implemented in any suitable fashion according to the operation described in the present disclosure. In some embodiments, high-side comparator 261 may be implemented with high-side sense transistor 541 and voltage comparator 551. In some embodiments, high-side sense transistor 541 may be configured as an NMOS sense FET for high-side transistor 41, with a drain coupled to the drain of high-side transistor 41, a gate coupled to the gate of high-side transistor 41, and a source coupled to average-current reference generator 230 to receive a sink current signal in the form of high-side average current reference IAVG_HS. High-side sense transistor 541 may be configured to have a size that is smaller than high-side transistor 41. For example, high-side sense transistor 541 may be configured to have a size that is smaller than high-side transistor 41 by a ratio of 1:100, 1:1000, 1:2000, 1:4000, 1:10000, or greater. In some embodiments, high-side sense transistor 541 may be implemented, for example, by one finger of a multiple-finger layout for high-side transistor 41. Accordingly, high-side sense transistor 541 may match high-side transistor 41 at the designed ratio.

In some embodiments, the high-side average current reference IAVG_HS provided by average-current reference generator 230 may have the same ratio relative to the average-current threshold as the respective sizes for high-side sense transistor 541 and high-side transistor 41. Accordingly, the drain-to-source voltage drop across high-side sense transistor 541 due to the high-side average current reference IAVG_HS may equal the voltage drop across high-side transistor 41 at the average-current threshold. Thus, as shown in FIG. 5A, voltage comparator 551 may compare the voltages at the respective sources of high-side sense transistor 541 and high-side transistor 41 to generate the high-side comparison signal CAHS. For example, when the high-side current through high-side transistor 41 is less than the average-current threshold, the voltage at the source of high-side transistor 41 may be greater than the voltage at the source of high-side sense transistor 541, and voltage comparator 551 may output a logic-low value for the high-side comparison signal CAHS. Conversely, when the high-side current through high-side transistor 41 exceeds the average-current threshold, the voltage at the source of high-side transistor 41 may cross below the voltage at the source of high-side sense transistor 541, and voltage comparator 551 may output a logic-high value for the high-side comparison signal CAHS.

Low-side comparator 262 may be implemented in any suitable fashion according to the operation described in the present disclosure. In some embodiments, low-side comparator 262 may be implemented with low-side sense transistor 542 and voltage comparator 552. In some embodiments, low-side sense transistor 542 may be configured as an NMOS sense FET for low-side transistor 42. For example, as shown in FIG. 5A, low-side sense transistor 542 may have a gate coupled to the gate of low-side transistor 42, a drain coupled to the drain of low-side transistor 42, and a source coupled to average-current reference generator 230 to receive the low-side average current reference IAVG_LS. Low-side sense transistor 542 may be configured to have a size that is smaller than low-side transistor 42. For example, low-side sense transistor 542 may be configured to have a size that is smaller than low-side transistor 42 by a ratio of 1:100, 1:1000, 1:2000, 1:4000, 1:10000, or greater. In some embodiments, low-side sense transistor 542 may be implemented, for example, by one finger of a multiple-finger layout for low-side transistor 42. Accordingly, low-side sense transistor 542 may match low-side transistor 42 at the designed ratio.

In some embodiments, the low-side average current reference IAVG_LS provided by average-current reference generator 230 may have the same ratio relative to the average-current threshold as the respective sizes for low-side sense transistor 542 and low-side transistor 42. Accordingly, the drain-to-source voltage drop across low-side sense transistor 542 due to the low-side average current reference IAVG_LS may equal the voltage drop across low-side transistor 42 at the average-current threshold. Thus, as shown in FIG. 5A, voltage comparator 552 may compare the voltages at the respective sources of low-side sense transistor 542 and low-side transistor 42 to generate the low-side comparison signal CALS. For example, when the low-side current through low-side transistor 42 is above the average-current threshold, the voltage at the source of low-side transistor 42 may be greater than the voltage at the source of low-side sense transistor 542, and voltage comparator 452 may output a logic-high value for the low-side comparison signal CALS. Conversely, when the low-side current through low-side transistor 42 drops below the average-current threshold, the voltage at the source of low-side transistor 42 may cross below the voltage at the source of low-side sense transistor 542, and voltage comparator 452 may output a logic-low value for the low-side comparison signal CALS.

As described above, high-side sense transistor 541 and low-side sense transistor 542 may be implemented as sense FETs for the respective high-side transistor 41 and low-side transistor 42. Accordingly, the current through high-side transistor 41 and low-side transistor 42 may be measured without adding an additional resistive element, such as a sense resistor, in the high-side or low-side current path. Sensing the respective high-side current and low-side current directly on high-side transistor 41 and low-side transistor 42 may thus avoid efficiency loss and heat generation that would otherwise be associated with using sense resistors in the high-side and low-side current paths to detect the high-side and low-side currents.

Although the embodiments above describe high-side sense transistor 541 and low-side sense transistor 542 as NMOS sense FETs, high-side sense transistor 541 and low-side sense transistor 542 may be implemented with any suitable transistor type to match the respective high-side transistor 41 and low-side transistor 42. For example, in embodiments where high-side transistor 41 is implemented with a PMOS transistor, high-side sense transistor 541 may likewise be implemented as a PMOS sense FET.

In some embodiments, high-side comparator 261 may be a chopper-stabilized high-side comparator. Likewise, low-side comparator 262 may be a chopper-stabilized low-side comparator. As shown in FIG. 2A and FIG. 5A, high-side comparator 261 and low-side comparator 262 may receive a chopper signal CHP to control chopper circuits included within voltage comparator 551 of high-side comparator 261 and within voltage comparator 552 of low-side comparator 262, respectively. In some embodiments, such as shown in FIG. 2A and FIG. 5A, high-side comparator 261 and low-side comparator 262 may receive the same common chopper signal such as chopper signal CHP. In other embodiments, high-side comparator 261 and low-side comparator 262 may receive separate high-side and low-side chopper signals. As described in further detail below with reference to FIGS. 6A-6B, a chopper circuit may be configured to alternate, during a first phase and a second phase, an input polarity of the input stage as well as an output polarity of an output stage internal to the voltage comparator 551 within high-side comparator 261. And as similarly described in further detail below with reference to FIGS. 7A-7B, a chopper circuit may be configured to alternate, during a first phase and a second phase, an input polarity of the input stage as well as an output polarity of an output stage internal to the voltage comparator 552 within low-side comparator 262.

Thus, any input offset present in the voltage comparator 551 of high-side comparator 261 or in the voltage comparator 552 of low-side comparator 262, due to semiconductor process variation for example, may have an equal or substantially equal magnitude and opposite polarity during the first and second phases. For example, if a −10 mV offset is present during the first phase when the chopper signal CHP is in a first state, a +10 mV offset may be present during the second phase when the chopper signal CHP is in a second state. And as described below, timer circuit 212 may monitor the high-side comparison signal CAHS and the low-side comparison signal CALS during the first phase and the second phase, and may provide a coarse offset compensation for one or both of the voltage comparator 551 within high-side comparator 261 or the voltage comparator 552 within low-side comparator 262.

Figure 5B:
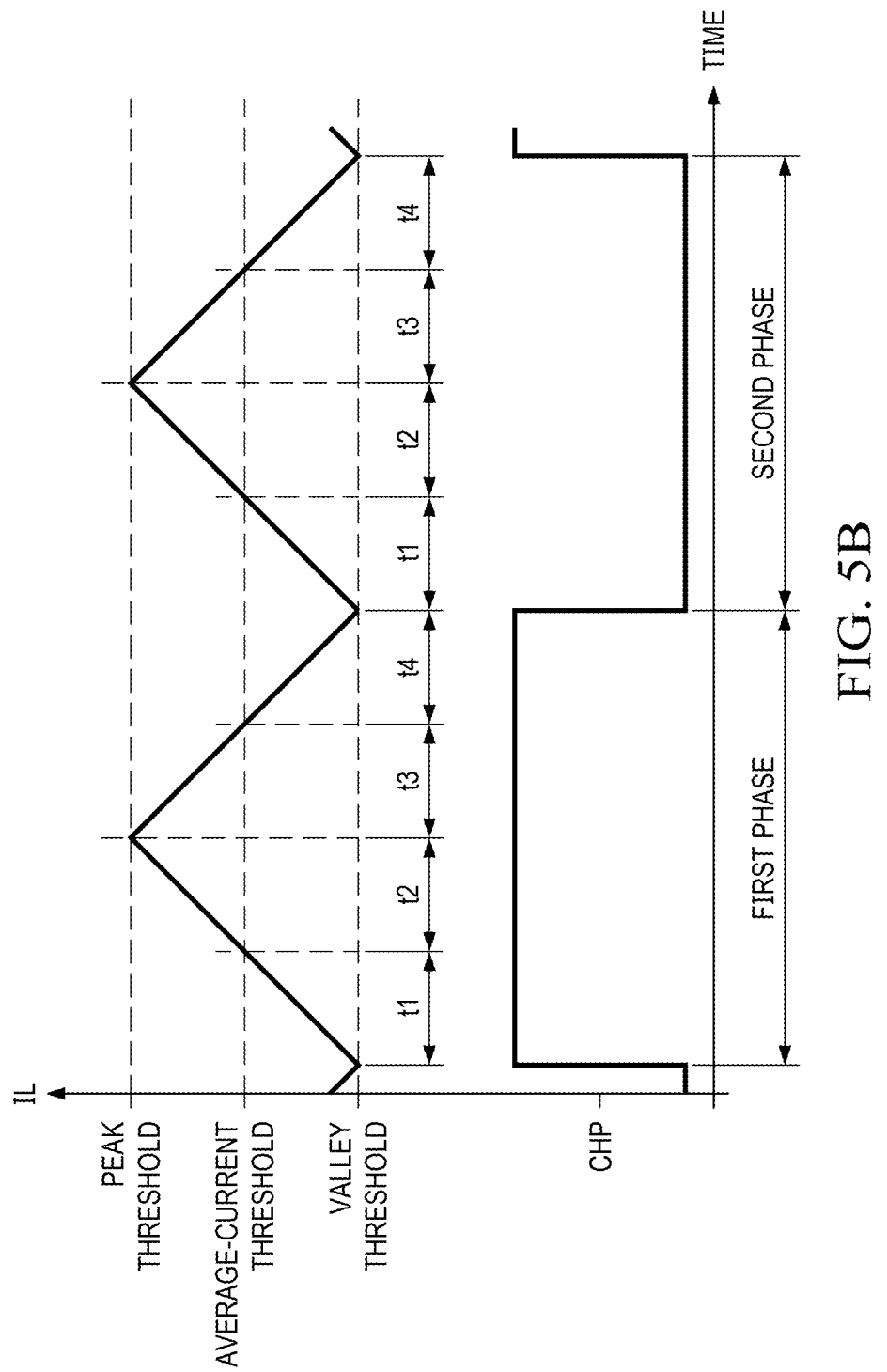
FIG. 5B illustrates waveforms of signals within an LED lighting system in accordance with embodiments of the present disclosure.

FIG. 5B illustrates waveforms of signals within LED lighting system 200 in accordance with embodiments of the present disclosure. The inductor current signal IL in FIG. 5B may represent the current through inductor 43 described above with reference to FIG. 2A. During the on-time ($t_{on}$) of high-side transistor 41, the rising high-side current flows through high-side transistor 41 and inductor 43. And during the off-time ($t_{off}$) of high-side transistor 41, when the low-side transistor is in an on-state, the falling low-side current flows through low-side transistor 42 and inductor 43. Thus, the rising portion of IL may represent the high-side current, and the falling portion of IL may represent the low-side current.

As shown in FIG. 5B, the time period during which the rising portion of IL (representative of the high-side current) is below the average-current threshold may be tabbed as time t1. And the time period during which the rising portion of IL (representative of the high-side current) is above the average-current threshold may be tabbed as time t2. Further, the time period during which the falling portion of IL (representative of the low-side current) is above the average-current threshold may be tabbed as time t3. And the time period during which the falling portion of IL (representative of the low-side current) is below the average-current threshold may be tabbed as time t4.

As also shown in FIG. 5B, the chopper signal CHP may have a first phase and a second phase. For example, the chopper signal CHP may be at a logic-high level during the first phase and at a logic-low level during the second phase. The chopper signal CHP, including the first phase and the second phase, may have a phase frequency aligned to the switching frequency of high-side transistor 41 and low-side transistor 42. For example, the chopper signal CHP controlling the phases of high-side comparator (in particular the voltage comparator 551 within high-side comparator 261) and low-side comparator 262 (in particular the voltage comparator 552 within low-side comparator 262) may have a frequency that is half of the switching frequency of high-side transistor 41 and low-side transistor 42. Accordingly, the first phase and the second phase may each align with a full switching cycle of high-side transistor 41 and low-side transistor 42.

High-side comparator 261 may compare the high-side current against the average-current threshold. And as described above with reference to FIG. 3A, high-side counter 302 may be configured to measure the first time period (t1) and the second time period (t2) based on the high-side comparison signal CAHS and the clock signal CLK. To measure the first time period (t1), high-side counter 302 may count the number of clock pulses when the high-side comparison signal CAHS indicates that the high-side current is less than the average-current threshold. Likewise, to measure the second time period (t2), high-side counter 302 may count the number of clock pulses when high-side comparison signal CAHS indicates that the high-side current is greater than the average-current threshold. An input offset present in high-side comparator 261 may induce an error around the transition point for the high-side comparison signal CAHS. Thus, the input offset present in high-side comparator 261 may induce errors in the respective counts for the first time period (t1) and the second time period (t2) proportional to the input offset. As described above, the input offset may have an equal or substantially equal magnitude and opposite polarity during the first and second phases of the chopper signal CHP. Thus, if a −10 mV offset is present during the first phase when the chopper signal CHP is in a first state, a +10 mV offset may be present during the second phase when the chopper signal CHP is in a second state. Accordingly, the error for the respective counts for the first time period (t1) and the second time period (t2) during the second phase may be of equal magnitude and opposite polarity as compared to the corresponding errors during the first phase.

Low-side comparator 262 may compare the low-side current against the average-current threshold. And as described above with reference to FIG. 3A, low-side counter 304 may be configured to measure the third time period (t3) and the fourth time period (t4) based on the low-side comparison signal CALS and the clock signal CLK. To measure the third time period (t3), low-side counter 304 may count the number of clock pulses when low-side comparison signal CALS indicates that the low-side current is greater than the average-current threshold. Likewise, to measure the fourth time period (t4), low-side counter 304 may count the number of clock pulses when the low-side comparison signal CALS indicates that the low-side current is less than the average-current threshold. An input offset present in low-side comparator 262 may induce an error around the transition point for the low-side comparison signal CALS. Thus, the input offset present in low-side comparator 262 may induce errors in the respective counts for the third time period (t3) and the fourth time period (t4) proportional to the input offset. As described above, the input offset may have an equal or substantially equal magnitude and opposite polarity during the first and second phases of the chopper signal CHP. Thus, if a −10 mV offset is present during the first phase when the chopper signal CHP is in a first state, a +10 mV offset may be present during the second phase when the chopper signal CHP is in a second state. Accordingly, the error for the respective counts for the third time period (t3) and the fourth time period (t4) during the second phase may be of equal magnitude and opposite polarity as compared to the corresponding errors during the first phase.

In some embodiments, the clock signal CLK may have a clock frequency that is higher than a phase frequency of the first phase and the second phase. For example, to provide higher resolution for the first count and the second count for each of the first time period (t1), the second time period (t2), the third time period (t3), and the fourth time period (t4), the clock signal CLK may have a clock frequency that is higher than a phase frequency of the first phase and the second phase by a ratio of at least 20:1, 40:1, 100:1, 1000:1, 2000:1, or more.

Referring back to FIG. 3A, offset-compensation circuit 306 may be coupled to high-side counter 302 and low-side counter 304. For example, offset-compensation circuit 306 may be coupled to receive from high-side counter 302 and low-side counter 304 a first count corresponding to the first phase for each of the first time period (t1), second time period (t2), third time period (t3), and fourth time period (t4), as well as a second count corresponding to the second phase for each of the first time period (t1), second time period (t2), third time period (t3), and fourth time period (t4).

The difference between the first count during the first phase and the second count during the second phase for the first time period (t1) may be proportional to the input offset for high-side comparator 261. Thus, to compensate for the input offset of high-side comparator 261, offset-compensation circuit 306 may generate a high-side offset-compensation signal HS_OFFSET that may adjust the input offset of high-side comparator 261 at a level that is proportional to the difference between the first count and the second count of the first time period (t1). The difference between the first count during the first phase and the second count during the second phase for the second time period (t2) may likewise be proportional to the input offset for high-side comparator 261. Thus, offset-compensation circuit 306 may also use the difference between the first count and the second count for the second time period (t2) to generate the high-side offset-compensation signal HS_OFFSET. For example, offset-compensation circuit 306 may generate the high-side offset-compensation signal HS_OFFSET that may adjust the input offset of high-side comparator 261 at a level that is proportional to the difference between the first count and the second count of the second time period (t2).

The difference between the first count during the first phase and the second count during the second phase for the third time period (t3) may be proportional to the input offset for low-side comparator 262. Thus, to compensate for the input offset of low-side comparator 262, offset-compensation circuit 306 may generate a low-side offset-compensation signal LS_OFFSET that may adjust the input offset of low-side comparator 262 at a level that is proportional to the difference between the first count and the second count of the third time period (t3). The difference between the first count during the first phase and the second count during the second phase for the fourth time period (t4) may likewise be proportional to the input offset for low-side comparator 262. Thus, offset-compensation circuit 306 may also use the difference between the first count and the second count for the fourth time period (t4) to generate the low-side offset-compensation signal LS_OFFSET. For example, offset-compensation circuit 306 may generate the low-side offset-compensation signal LS_OFFSET that may adjust the input offset of low-side comparator 262 at a level that is proportional to the difference between the first count and the second count of the fourth time period (t4).

In some embodiments, timer circuit 212 may be configured to adjust the peak threshold and the valley threshold in response to a first average of the first time period (t1) across two or more chopper phases, a second average of the second time period (t2) across the two or more chopper phases, a third average of the third time period (t3) across the two or more chopper phases, and/or a fourth average of the fourth time period (t4) across the two or more chopper phases. For example, the time-comparison circuit 308 within timer circuit 212 may account for multiple measurements of the first time period (t1), the second time period (t2), the third time period (t3), and/or the fourth time period (t4) across the first and second chopper phases, when generating the P_ADJ and V_ADJ signals to adjust the peak threshold and the valley threshold as described above. Time-comparison circuit 308 may average first and second measurements for each of the first time period (t1), the second time period (t2), the third time period (t3), and the fourth time period (t4) across the first and second chopper phases, when determining any adjustments to the peak threshold and the valley threshold. By averaging the measurements for each of t1, t2, t3, and t4 across two or more chopper phases, the chopper operation may provide a further fine offset cancellation of any offset remaining after application of the coarse offset compensation provided by the high-side offset-compensation signal HS_OFFSET and the low-side offset-compensation signal LS_OFFSET.

Thus, in some embodiments, continued operation of the chopper circuit within high-side comparator 261 and the chopper circuit within low-side comparator 262 may provide a further fine offset cancellation in addition to the coarse offset compensation provided by the high-side offset-compensation signal HS_OFFSET and the low-side offset-compensation signal LS_OFFSET. Given the initial coarse offset compensation provided by HS_OFFSET and LS_OFFSET, noise generated by the continued chopper operation may be reduced as the difference between the first phase and the second phase may be reduced by the coarse offset compensation. Nonetheless, in some embodiments, to reduce or eliminate noise associated with continued chopper operation, high-side comparator 261 and/or low-side comparator 262 may be configured to disable chopping after the initial setting of the high-side offset-compensation signal HS_OFFSET and the low-side offset-compensation signal LS_OFFSET.

Figure 6A:
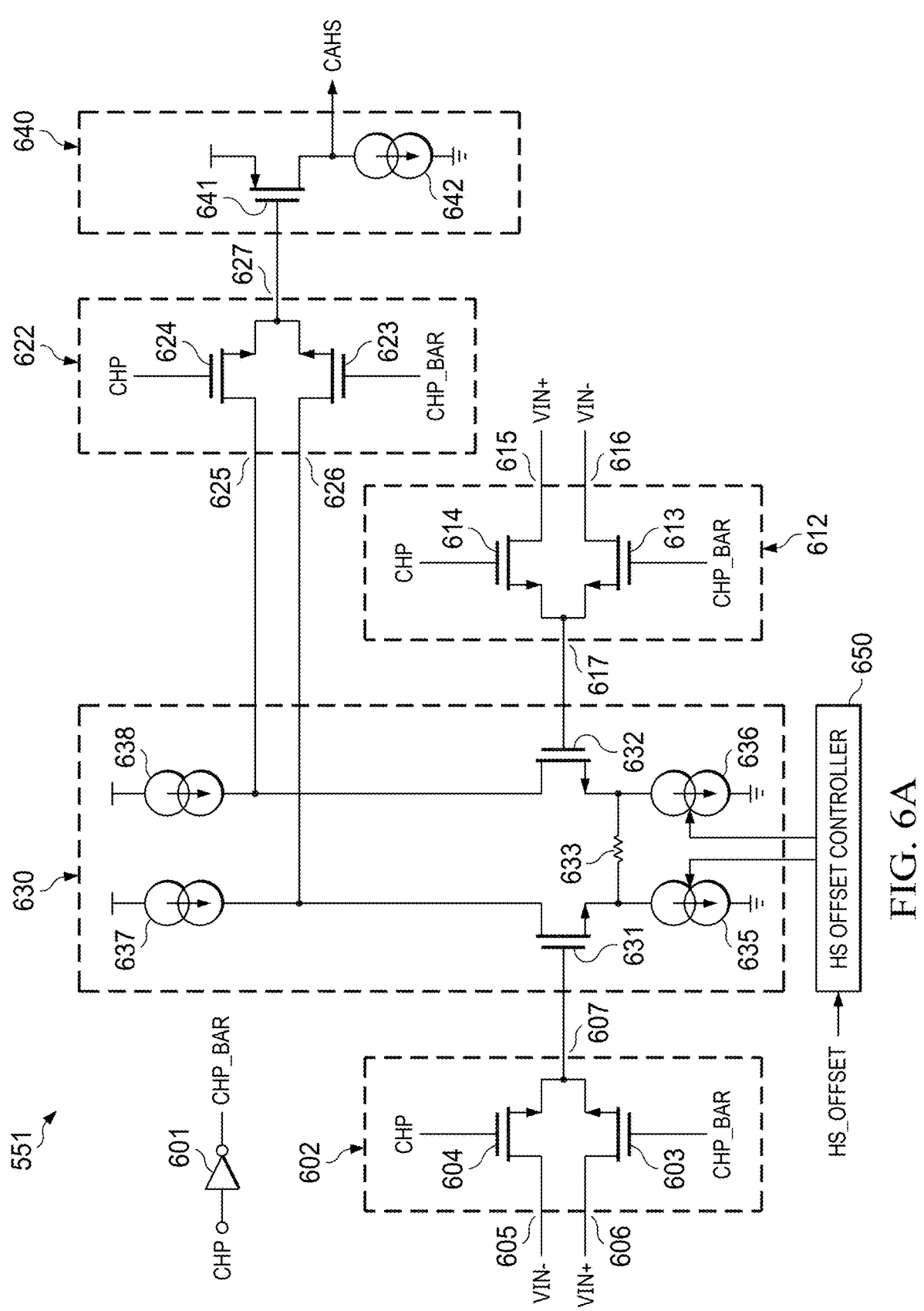
FIG. 6A illustrates a schematic diagram of a voltage comparator in accordance with embodiments of the present disclosure.

FIG. 6A illustrates a schematic diagram of voltage comparator 551 in accordance with embodiments of the present disclosure. Voltage comparator 551 may be implemented in any suitable fashion according to the operation described in the present disclosure. As shown in FIG. 6A, voltage comparator 551 may include input stage 630, output stage 640, high-side offset controller 650, and a chopper circuit collectively formed by pass gates 602, 612, and 622.

Input stage 630 may include first transistor 631 and second transistor 632 configured together as a differential pair. In some embodiments, first transistor 631 and second transistor 632 may be NMOS transistors. As shown in FIG. 6A, the source of first transistor 631 may be coupled to a first current source 635, and the source of second transistor 632 may be coupled to a second current source 636. Resistor 633 may be coupled between the respective sources of first transistor 631 and second transistor 632. Accordingly, and as described in further detail below with reference to high-side offset controller 650, input offset compensation may be injected into input stage 630 based on the resistance value of resistor 633 and the difference between the bias currents provided by first current source 635 and second current source 636. Input stage 630 may further include a current source 637 coupled to the drain of first transistor 631 and current source 638 coupled to the drain of second transistor 632. In some embodiments, the bias currents provided by current source 637 and current source 638 may match each other. For example, in some embodiments, current source 637 and current source 638 may be implemented by matching output branches of a current mirror such that the bias current provided by current source 637 matches the bias current provided by current source 638. With first transistor 631 and second transistor 632 being configured together as a differential pair, first transistor 631 and second transistor 632 may amplify any difference in voltage signals received at the respective gates of first transistor 631 and second transistor 632.

Output stage 640 may be coupled to input stage 630 and may be configured to generate the high-side comparison signal CAHS. Output stage 640 may include output transistor 641 and current source 642. In some embodiments, output transistor may be a PMOS transistor. As shown in FIG. 6A, output transistor 641 may have a source coupled to a supply voltage and a drain coupled to current source 642. The gate of output transistor 641 may be coupled, via pass gate 622, to the drain of either first transistor 631 or second transistor 632 depending on the state of pass gate 622. Output stage 640, and output transistor 641 in particular, may thus further amplify the output of input stage 630. In some embodiments, output transistor 641 may generate the high-side comparison signal CAHS at its drain.

In addition to input stage 630 and output stage 640, voltage comparator 551 may include a chopper circuit collectively formed by pass gates 602, 612, and 622. The chopper circuit may be configured to alternate an input polarity of input stage 630 during a first phase and a second phase of the chopper signal CHP. The chopper circuit may also be configured to alternate an output polarity of output stage 640 during the first phase and the second phase of the chopper signal CHP.

As shown in FIG. 6A, inverter 601 may invert the chopper signal CHP to create an additional inverse chopper signal CHP_BAR. Pass gates 602, 612, and 622 may utilize CHP and CHP_BAR to selectively pass a signal from one of two pass-gate inputs to the pass-gate output.

Pass gate 602 may include a first pass transistor 604 having a drain coupled to a first pass-gate input 605, a gate driven by the chopper signal CHP, and a source coupled to the pass-gate output 607. Pass gate 602 may also include a second pass transistor 603 having a drain coupled to a second pass-gate input 606, a gate driven by the inverse chopper signal CHP_BAR, and a source coupled to the pass-gate output 607. Pass gate 612 may be configured in a similar manner as pass gate 602. For example, pass gate 612 may include a first pass transistor 614 having a drain coupled to a first pass-gate input 615, a gate driven by the chopper signal CHP, and a source coupled to the pass-gate output 617. Pass gate 612 may also include a second pass transistor 613 having a drain coupled to a second pass-gate input 616, a gate driven by the inverse chopper signal CHP_BAR, and a source coupled to the pass-gate output 617. Pass gate 622 may also be configured in a similar manner as pass gate 602 and pass gate 612. For example, pass gate 622 may include a first pass transistor 624 having a drain coupled to a first pass-gate input 625, a gate driven by the chopper signal CHP, and a source coupled to the pass-gate output 627. Pass gate 622 may also include a second pass transistor 623 having a drain coupled to a second pass-gate input 626, a gate driven by the inverse chopper signal CHP_BAR, and a source coupled to the pass-gate output 627. Although the individual pass transistors of pass gate 602, pass gate 612, and pass gate 622 are illustrated in FIG. 6A as being implemented by NMOS transistors, the individual pass transistors of pass gates 602, 612, and 622 may alternatively be implemented by, for example, PMOS transistors. In such alternative embodiments utilizing PMOS transistors instead of NMOS transistors, the individual pass transistors of pass gates 602, 612, and 622 may be driven by the opposite signal from among CHP and CHP_BAR than is shown in FIG. 6A to achieve the same functionality as the NMOS-based pass gates shown in FIG. 6A.

As shown in FIG. 6A, pass gate 602 may couple the gate of first transistor 631 to the negative input terminal VIN– of voltage comparator 551 during a first phase when the chopper signal CHP is in a logic-high state, and may alternatively couple the gate of first transistor 631 to the positive input terminal VIN+ of voltage comparator 551 during a second phase when the inverse chopper signal CHP_BAR is in a logic-high state. In a similar manner, pass gate 612 may couple the gate of second transistor 632 to the positive input terminal VIN+ of voltage comparator 551 during the first phase when the chopper signal CHP is in a logic-high state, and may alternatively couple the gate of second transistor 632 to the negative input terminal VIN– of voltage comparator 551 during the second phase when the inverse chopper signal CHP_BAR is in a logic-high state. Passs gate 602 and pass gate 612 may thus alternate the input polarity of input stage 630 during the first phase and the second phase.

As also shown in FIG. 6A, the chopper circuit may be further configured to alternate the coupling between input stage 630 and output stage 640 during the first phase and the second phase to alternate an output polarity of output stage 640 during the first phase and the second phase. For example, pass gate 622 may couple the gate of output transistor 641 to the drain of second transistor 632 during a first phase when the chopper signal CHP is in a logic-high state, and may alternatively couple the gate of output transistor 641 to the drain of first transistor 631 during a second phase when the inverse chopper signal CHP_BAR is in a logic-high state. Pass gate 622 may thus alternate the output polarity of output stage 640 during the first phase and the second phase.

High-side offset controller 650 may be configured to adjust an input offset of voltage comparator 551 based on HS_OFFSET. For example, high-side offset controller 650 may be configured to control the first current source 635 and second current source 636 respectively coupled to bias first transistor 631 and second transistor 632 of input stage 630. In some embodiments, first current source 635 and second current source 636 may be configured to match when in a default state and to thereby provide equal bias currents to first transistor 631 and second transistor 632. Based on HS_OFFSET, high-side offset controller 650 may then adjust first current source 635 and/or second current source 636 to cause the respective currents provided by first current source 635 and/or second current source 636 to be different from each other. The resistance of resistor 633 multiplied by half the difference between the bias currents respectively provided by first current source 635 and second current source 636 will inject an input offset into input stage 630. Accordingly, as described above, high-side offset controller 650 may adjust the input offset of voltage comparator 551 based on the HS_OFFET, to compensate for an offset detected by offset-compensation circuit 306 as described above.

Although the embodiment shown in FIG. 6A utilizes high-side offset controller 650 to control first current source 635 and second current source 636 to adjust the input offset of voltage comparator 551, any other scheme suitable to adjust the input offset of voltage comparator 551 may be utilized and controlled for example by high-side offset controller 650. For example, in some embodiments, resistor 633 may be omitted and the sources of first transistor 631 and second transistor 632 may be coupled directly together and to a single current source. In such embodiments, the input offset may be adjusted by other suitable techniques. For example, high-side offset controller 650 may be configured to vary the respective bias currents of current source 637 and current source 638 to adjust the input offset of voltage comparator 551. In such example embodiments, current source 637 and current source 638 may include matching output branches of a current mirror as described above, in addition to small adjustable current sources and/or current-mirror outputs configured to controllably adjust the total bias currents provided by current source 637 and current source 638. As another example, high-side offset controller 650 may be configured to adjust a voltage drop directly at the gate of first transistor 631 and/or at the gate of second transistor 632.

Further, although the embodiment of voltage comparator 551 shown in FIG. 6A includes input stage 630 and output stage 640, other embodiments may include other circuit topologies for input stage 630 and output stage 640. Moreover, other embodiments may include additional intermediate stages between input stage 630 and output stage 640. In such other embodiments, the output stage may be considered to be coupled to the input stage via the further intermediate stages.

Figure 6B:
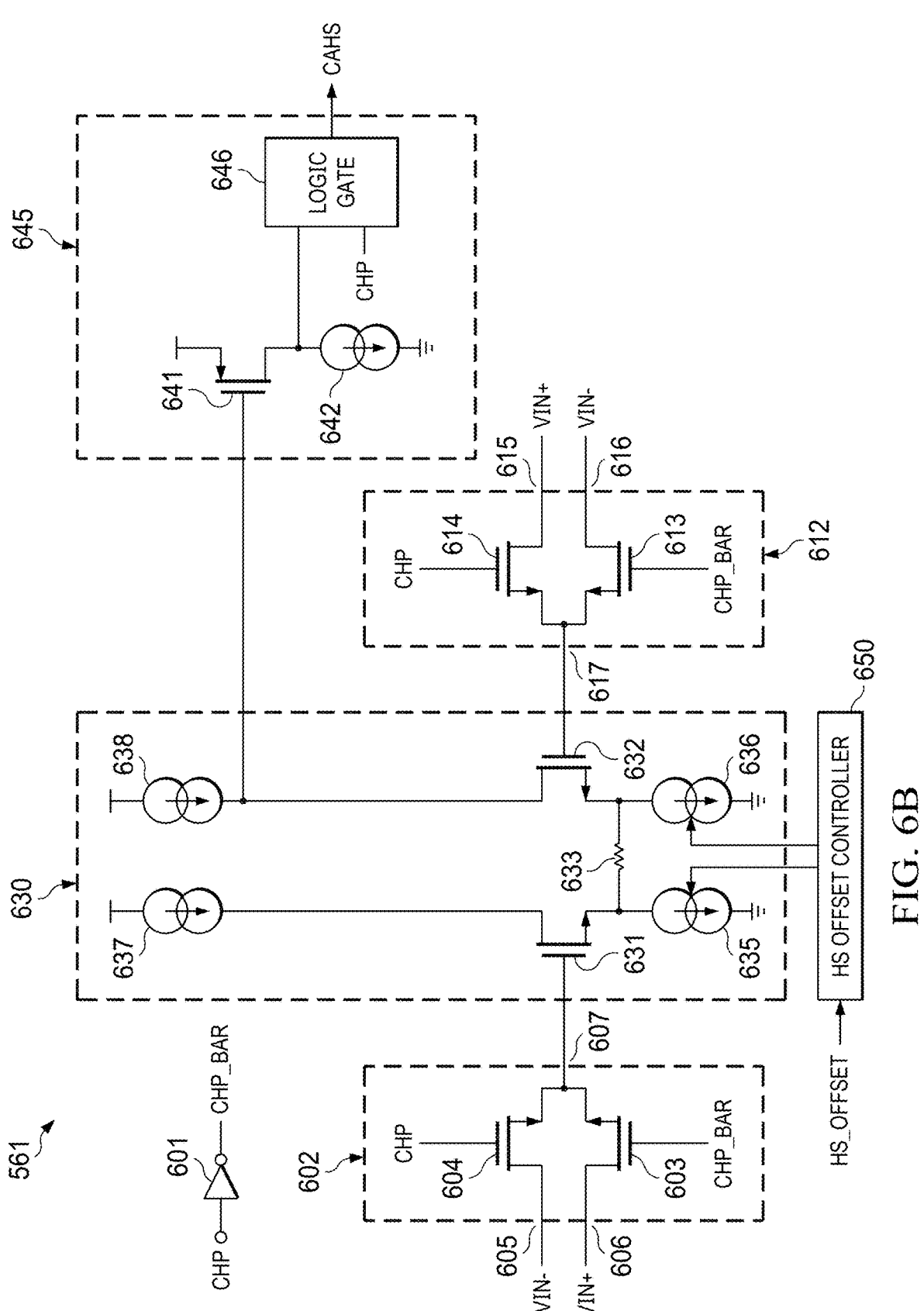
FIG. 6B illustrates a schematic diagram of a voltage comparator in accordance with embodiments of the present disclosure.

FIG. 6B illustrates a schematic diagram of voltage comparator 561 in accordance with embodiments of the present disclosure. Voltage comparator 561 may represent an alternate embodiment of voltage comparator 551 described above with reference to FIG. 5A and FIG. 6A. Voltage comparator 561 may be implemented in any suitable fashion according to the operation described in the present disclosure. As shown in FIG. 6B, voltage comparator 561 may include certain components similar to voltage comparator 551 described above with reference to FIG. 6A, including input stage 630, high-side offset controller 650, inverter 601, pass gate 602, and pass gate 612. Each of input stage 630, high-side offset controller 650, inverter 601, pass gate 602, and pass gate 612 may operate in a similar manner as described above for voltage comparator 551.

Voltage comparator 561 may also include output stage 645. Similar to output stage 640 of voltage comparator 551, output stage 645 may include output transistor 641 and current source 642. Output transistor 641 and current source 642 may operate in a similar manner within output stage 645 as described above for output stage 640 of voltage comparator 551. For example, current source 642 may bias output transistor 641, which may further amplify the output of input stage 630. As shown in FIG. 6B, the gate of output transistor 641 may be coupled to the output of input stage 630 at the drain of second transistor 632. Thus, the coupling between input stage 630 and output stage 645 in voltage comparator 561 may remain the same across the first phase and the second phase of the chopper operation.

Output stage 645 may utilize logic gate 646 to logically alternate the output polarity of output stage 645 during the first phase and the second phase of the chopper operation. For example, the drain of output transistor 641 may be coupled to a first logic input of logic gate 646. One of the chopper signal CHP or the inverse chopper signal CHP_BAR may be coupled to a second logic input of logic gate 646. Logic gate 646 may thus utilize a logic operation to alternate the output polarity of output stage 645 across the first phase and the second phase of the chopper operation.

For example, in some embodiments where the chopper signal CHP is coupled to the second logic input of logic gate 646, logic gate 646 may be implemented as an XNOR logic gate to generate the high-side comparison signal CAHS. In other embodiments, logic gate 646 may be implemented as other types of logic gates suitable to alternate the output polarity of output stage 645 depending on the polarities of the signals coupled to the first logic input and the second logic input of logic gate 646. Further, for the purposes of the present disclosure, logic gate 646 may be considered part of output stage 645 and/or part of the chopper circuitry collectively formed by pass gate 602 and pass gate 612. Accordingly, the chopper circuit including logic gate 646 may be configured to logically alternate the output polarity of the output stage during the first phase and the second phase of the chopper operation.

Figure 7A:
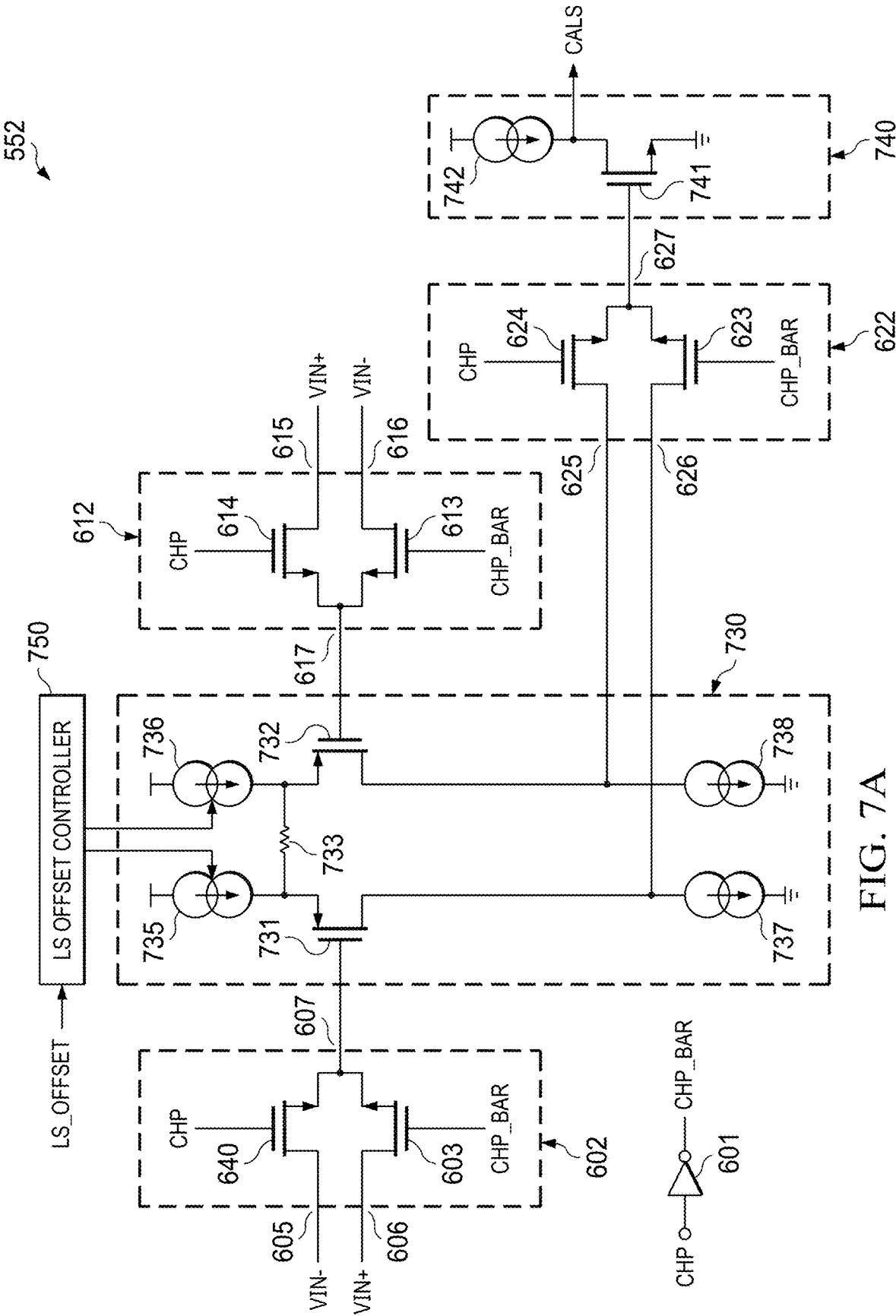
FIG. 7A illustrates a schematic diagram of a voltage comparator in accordance with embodiments of the present disclosure.

FIG. 7A illustrates a schematic diagram of voltage comparator 552 in accordance with embodiments of the present disclosure. Voltage comparator 552 may be implemented in any suitable fashion according to the operation described in the present disclosure. As shown in FIG. 7A, voltage comparator 552 may include input stage 730, output stage 740, low-side offset controller 750, and a chopper circuit collectively formed by pass gates 602, 612, and 622.

Input stage 730 may include first transistor 731 and second transistor 732 configured together as a differential pair. In some embodiments, first transistor 731 and second transistor 732 may be PMOS transistors. As shown in FIG. 7A, the source of first transistor 731 may be coupled to a first current source 735, and the source of second transistor 732 may be coupled to a second current source 736. Resistor 733 may be coupled between the respective sources of first transistor 731 and second transistor 732. Accordingly, and as described in further detail below with reference to low-side offset controller 750, input offset compensation may be injected into input stage 730 based on the resistance value of resistor 733 and the difference between the bias currents provided by first current source 735 and second current source 736. Input stage 730 may further include a current source 737 coupled to the drain of first transistor 731 and current source 738 coupled to the drain of second transistor 732. In some embodiments, the bias currents provided by current source 737 and current source 738 may match each other. For example, in some embodiments, current source 737 and current source 738 may be implemented by matching output branches of a current mirror such that the bias current provided by current source 737 matches the bias current provided by current source 738. With first transistor 731 and second transistor 732 being configured together as a differential pair, first transistor 731 and second transistor 732 may amplify any difference in voltage signals received at the respective gates of first transistor 731 and second transistor 732.

Output stage 740 may be coupled to input stage 730 and may be configured to generate the low-side comparison signal CALS. Output stage 740 may include output transistor 741 and current source 742. In some embodiments, output transistor may be an NMOS transistor. As shown in FIG. 7A, output transistor 741 may have a source coupled to ground GND and a drain coupled to current source 742. The gate of output transistor 741 may be coupled, via pass gate 722, to the drain of either first transistor 731 or second transistor 732 depending on the state of pass gate 722. Output stage 740, and output transistor 741 in particular, may thus further amplify the output of input stage 730. In some embodiments, output transistor 741 may generate the low-side comparison signal CALS at its drain.

In addition to input stage 730 and output stage 740, voltage comparator 552 may include a chopper circuit collectively formed by pass gates 602, 612, and 622. The chopper circuit may be configured to alternate an input polarity of input stage 730 during a first phase and a second phase of the chopper signal CHP. The chopper circuit may also be configured to alternate an output polarity of output stage 740 during the first phase and the second phase of the chopper signal CHP.

As shown in FIG. 7A, inverter 601 may invert the chopper signal CHP to create an additional inverse chopper signal CHP_BAR. Pass gates 602, 612, and 622 may utilize CHP and CHP_BAR to selectively pass a signal from one of two pass-gate inputs to the pass-gate output.

As shown in FIG. 7A, pass gate 602 may couple the gate of first transistor 731 to the negative input terminal VIN− of voltage comparator 552 during a first phase when the chopper signal CHP is in a logic-high state, and may alternatively couple the gate of first transistor 731 to the positive input terminal VIN+ of voltage comparator 552 during a second phase when the inverse chopper signal CHP_BAR is in a logic-high state. In a similar manner, pass gate 612 may couple the gate of second transistor 732 to the positive input terminal VIN+ of voltage comparator 552 during the first phase when the chopper signal CHP is in a logic-high state, and may alternatively couple the gate of second transistor 732 to the negative input terminal VIN− of voltage comparator 552 during the second phase when the inverse chopper signal CHP_BAR is in a logic-high state. Passs gate 602 and pass gate 612 may thus alternate the input polarity of input stage 730 during the first phase and the second phase of the chopper operation.

As also shown in FIG. 7A, the chopper circuit may be further configured to alternate the coupling between input stage 730 and output stage 740 during the first phase and the second phase to alternate an output polarity of output stage 740 during the first phase and the second phase. For example, pass gate 622 may couple the gate of output transistor 741 to the drain of second transistor 732 during a first phase when the chopper signal CHP is in a logic-high state, and may alternatively couple the gate of output transistor 741 to the drain of first transistor 731 during a second phase when the inverse chopper signal CHP_BAR is in a logic-high state. Pass gate 622 may thus alternate the output polarity of output stage 740 during the first phase and the second phase.

Low-side offset controller 750 may be configured to adjust an input offset of voltage comparator 552 based on LS_OFFSET. For example, low-side offset controller 750 may be configured to control first current source 735 and second current source 736 respectively coupled to bias first transistor 731 and second transistor 732 of input stage 730. In some embodiments, first current source 735 and second current source 736 may be configured to match when in a default state and to thereby provide equal bias currents to first transistor 731 and second transistor 732. Based on the LS_OFFSET signal, low-side offset controller 750 may then adjust first current source 735 and/or second current source 736 to cause the respective currents provided by first current source 735 and/or second current source 736 to be different from each other. The resistance of resistor 733 multiplied by the difference between the bias currents respectively provided by first current source 735 and second current source 736 will inject an input offset into input stage 730. Accordingly, as described above, low-side offset controller 750 may adjust the input offset of voltage comparator 552 based on the LS_OFFSET signal, to compensate for an offset detected by offset-compensation circuit 306 as described above.

Although the embodiment shown in FIG. 7A utilizes low-side offset controller 750 to control first current source 735 and second current source 736 to adjust the input offset of voltage comparator 552, any other scheme suitable to adjust the input offset of voltage comparator 552 may be utilized and controlled for example by low-side offset controller 750. For example, in some embodiments, resistor 733 may be omitted and the sources of first transistor 731 and second transistor 732 may be coupled directly together and to a single current source. In such embodiments, the input offset may be adjusted by other suitable techniques. For example, low-side offset controller 750 may be configured to vary the respective bias currents of current source 737 and current source 738 to adjust the input offset of voltage comparator 552. In such example embodiments, current source 737 and current source 738 may include matching output branches of a current mirror as described above, in addition to small adjustable current sources and/or current-mirror outputs configured to controllably adjust the total bias currents provided by current source 737 and current source 738. As another example, low-side offset controller 750 may be configured to adjust a voltage drop directly at the gate of first transistor 731 and/or at the gate of second transistor 732.

Further, although the embodiment of voltage comparator 552 shown in FIG. 7A includes input stage 730 and output stage 740, other embodiments may include other circuit topologies for input stage 730 and output stage 740. Moreover, other embodiments may include additional intermediate stages between input stage 730 and output stage 740. In such other embodiments, the output stage may be considered to be coupled to the input stage via the further intermediate stages.

Figure 7B:
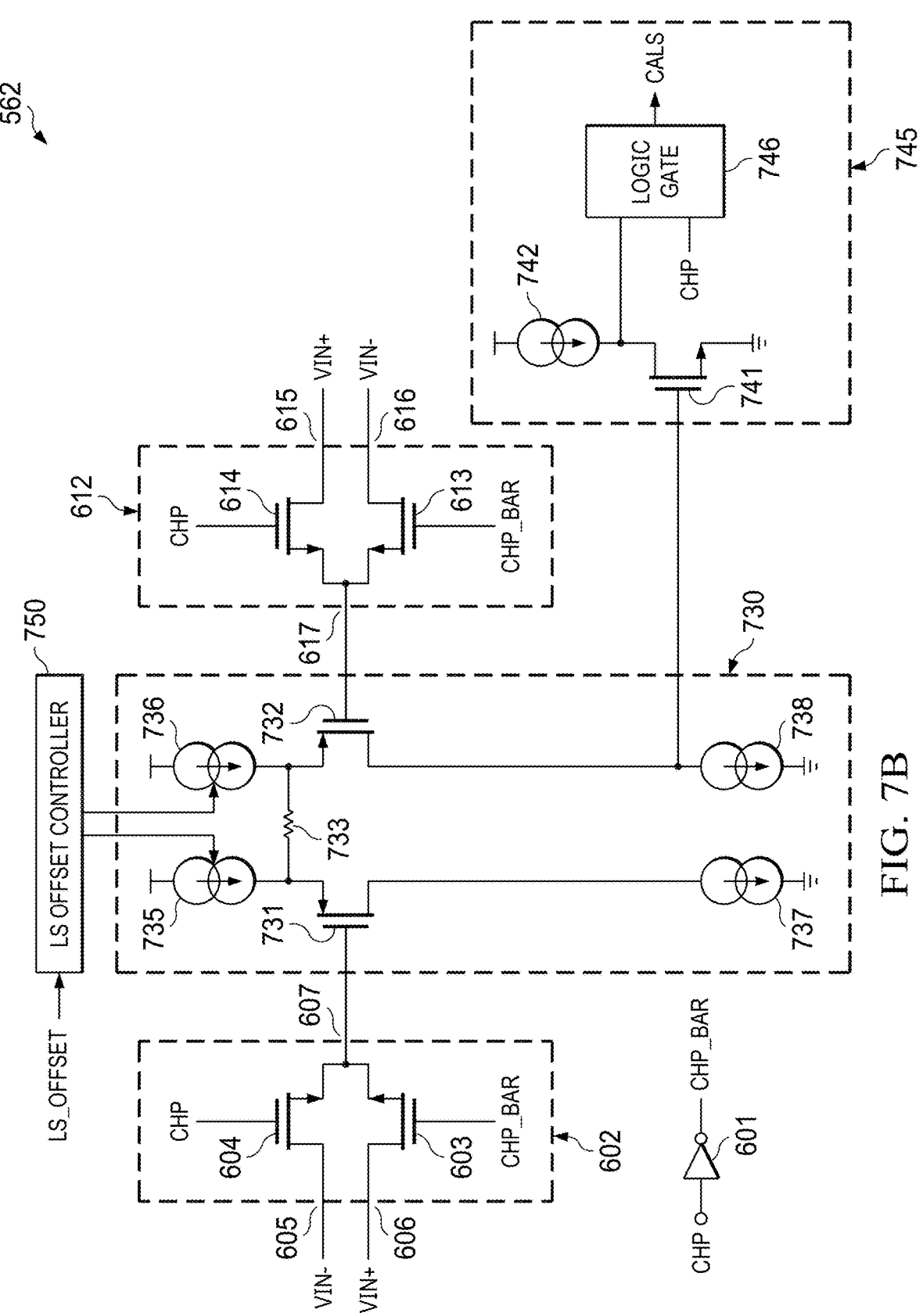
FIG. 7B illustrates a schematic diagram of a voltage comparator in accordance with embodiments of the present disclosure.

FIG. 7B illustrates a schematic diagram of voltage comparator 562 in accordance with embodiments of the present disclosure. Voltage comparator 562 may represent an alternate embodiment of voltage comparator 552 described above with reference to FIG. 5A and FIG. 7A. Voltage comparator 562 may be implemented in any suitable fashion according to the operation described in the present disclosure. As shown in FIG. 7B, voltage comparator 562 may include certain components similar to voltage comparator 552 described above with reference to FIG. 7A, including input stage 730, low-side offset controller 750, inverter 601, pass gate 602, and pass gate 612. Each of input stage 730, low-side offset controller 750, inverter 601, pass gate 602, and pass gate 612 may operate in a similar manner as described above for voltage comparator 551.

Voltage comparator 562 may also include output stage 745. Similar to output stage 740 of voltage comparator 552, output stage 745 may include output transistor 741 and current source 742. Output transistor 741 and current source 742 may operate in a similar manner within output stage 745 as described above for output stage 740 of voltage comparator 552. For example, current source 742 may bias output transistor 741, which may further amplify the output of input stage 730. As shown in FIG. 7B, the gate of output transistor 741 may be coupled to the output of input stage 730 at the drain of second transistor 732. Thus, the coupling between input stage 730 and output stage 745 in voltage comparator 562 may remain the same across the first phase and the second phase of the chopper operation.

Output stage 745 may utilize logic gate 746 to logically alternate the output polarity of output stage 745 during the first phase and the second phase of the chopper operation.

For example, the drain of output transistor 741 may be coupled to a first logic input of logic gate 746. One of the chopper signal CHP or the inverse chopper signal CHP-_BAR may be coupled to a second logic input of logic gate 746. Logic gate 746 may thus utilize a logic operation to alternate the output polarity of output stage 745 across the first phase and the second phase of the chopper operation. For example, in some embodiments where the chopper signal CHP is coupled to the second logic input of logic gate 746, logic gate 746 may be implemented as an XNOR logic gate to generate the low-side comparison signal CALS. In other embodiments, logic gate 746 may be implemented as other types of logic gates suitable to alternate the output polarity of output stage 745 depending on the polarities of the signals coupled to the first logic input and the second logic input of logic gate 746. Further, for the purposes of the present disclosure, logic gate 746 may be considered part of output stage 745 and/or part of the chopper circuit collectively formed by pass gate 602 and pass gate 612. Accordingly, the chopper circuit including logic gate 746 may be configured to logically alternate the output polarity of the output stage during the first phase and the second phase of the chopper operation.

Figure 8A:
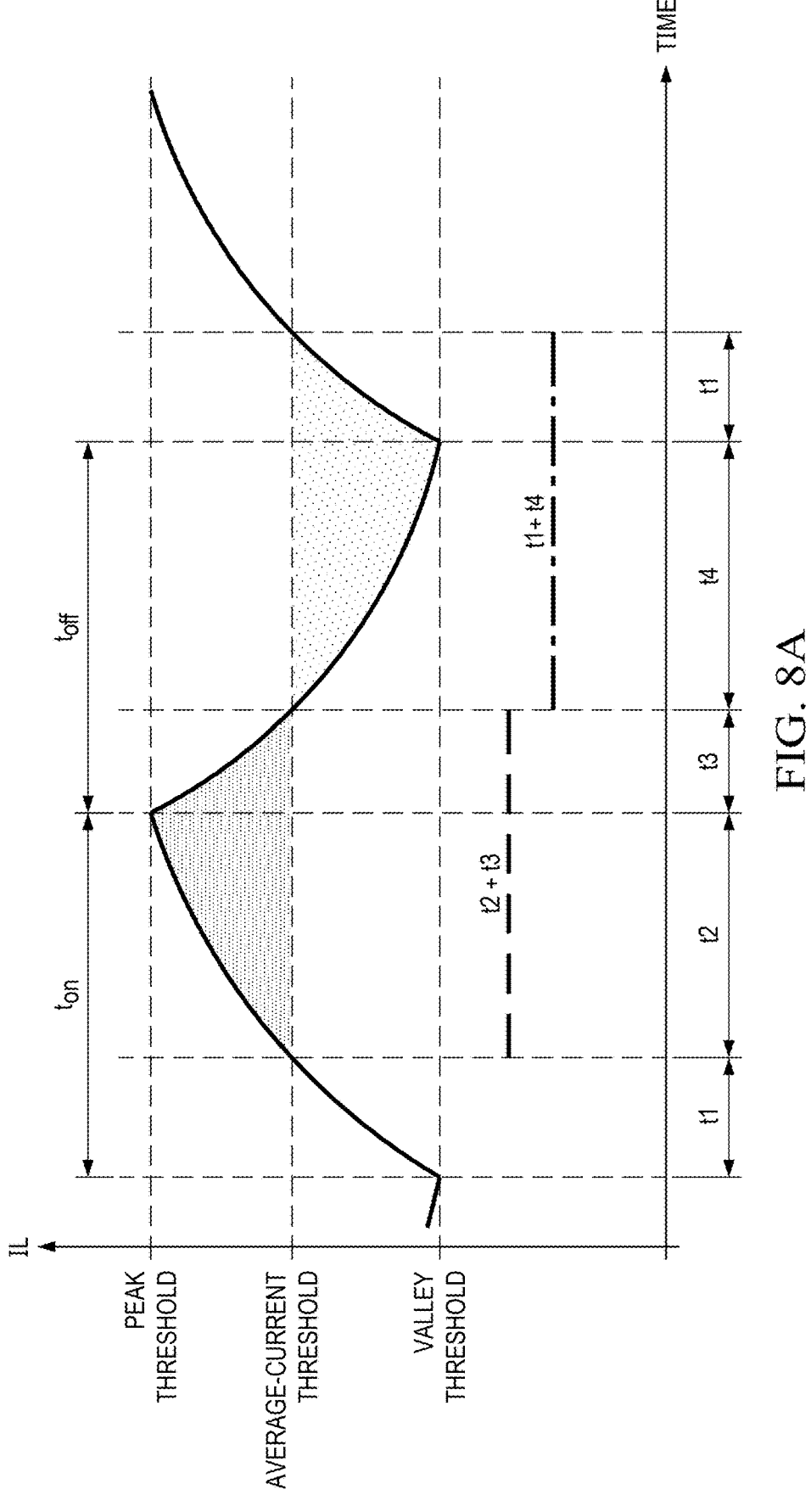
FIG. 8A illustrates a waveform of an inductor current signal in DC-DC converter in accordance with embodiments of the present disclosure.

FIG. 8A illustrates a waveform of an inductor current signal IL in the DC-DC converter of LED lighting system 200 in accordance with embodiments of the present disclosure. The inductor current signal IL in FIG. 8A may represent the current through inductor 43 described above with reference to FIG. 2A. During the on-time ($t_{on}$) of high-side transistor 41, the rising high-side current flows through high-side transistor 41 and inductor 43. And during the off-time ($t_{off}$) of high-side transistor 41, when the low-side transistor is in an on-state, the falling low-side current flows through low-side transistor 42 and inductor 43. Thus, the rising portion of IL may represent the high-side current, and the falling portion of IL may represent the low-side current.

As described above with reference to FIG. 2C, if the total time that IL is above the average-current threshold is equal to the total time that IL is below the average-current threshold, then the average output current IOUT may be equal to the average-current threshold. Accordingly, when the sum of t2 plus t3 is equal to the sum of t1 plus t4, the average output current IOUT may be equal to the average-current threshold set according to the desired average output current of the buck converter.

Under some conditions, parasitic resistances in the DC-DC converter, such as the on-state resistances of high-side transistor 41 and low-side transistor 42, the series resistance of inductor 43, and/or the series resistance of the plurality of LEDs 104a-104n, may cause the inductor current signal IL to include a curvature, such as shown in FIG. 8A. When high-side transistor 41 is switching at a fifty percent duty cycle, the curvature of the rising slope and the falling slope may effectively cancel each other out, and average output current IOUT may remain equal to the average-current threshold when the sum of t2 plus t3 is equal to the sum of t1 plus t4. However, at duty cycles less than or greater than fifty percent, the curvature of IL may introduce an error between the average output current IOUT and the average-current threshold when the sum of t2 plus t3 is equal to the sum of t1 plus t4. In some embodiments, the error for a given embodiment may depend specifically on the duty cycle at which high-side transistor 41 is operating. For example, as the duty cycle increases further above fifty percent, or decreases further below fifty percent, the IL waveform may be predominated more by one of the rising slope or the falling slope of IL. Thus, under certain conditions, the error may become greater with larger duty cycles further above fifty percent, or with smaller duty cycles further below fifty percent. The error may also depend on a number of factors affecting the rising and falling slopes of IL. For example, the error may depend on the input voltage VIN and output voltage VOUT, as well as the combined parasitic resistance including the on-state resistances of high-side transistor 41 and low-side transistor 42, the series resistance of inductor 43, and/or the series resistance of the plurality of LEDs 104a-104n. As another example, and as described below with reference to FIG. 8B, the error may also depend on the inductance value of inductor 43. As yet another example, and as described below with reference to FIG. 8C, the error may depend on the switching frequency of high-side transistor 41 and low-side transistor 42 And as described below with reference to FIG. 8D, curvature compensation circuit 216 may account for one or more of these factors when compensating for curvature-induced errors.

Figure 8B:
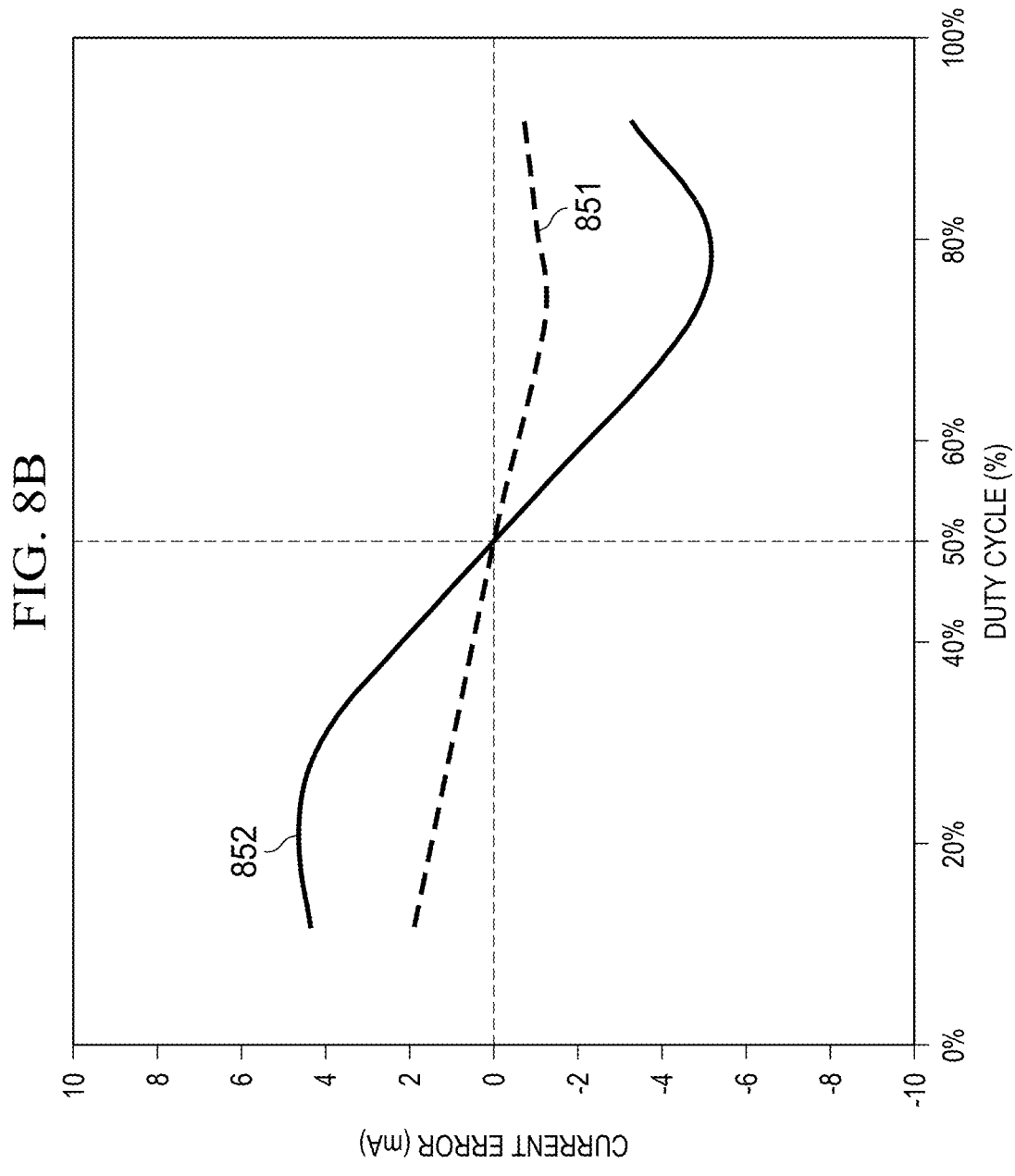
FIG. 8B illustrates plot diagrams of a curvature error in accordance with embodiments of the present disclosure.

FIG. 8B illustrates plot diagrams of a curvature error in accordance with embodiments of the present disclosure. Specifically, FIG. 8B illustrates plot diagrams demonstrating the effect that the inductance value of inductor 43 may have on the curvature error for the DC-DC converter formed by DC-DC converter circuit 201, inductor 43, and capacitor 44. As described above, in some embodiments, the switching frequency of high-side transistor 41 and low-side transistor 42 may vary or may be controlled and/or held constant by control circuit 202. Plot 851 and plot 852 illustrate the current error for the average-current regulation caused by the curvature of IL under a fixed switching frequency, of for example 500 kHz, and with varied inductor values. For example, plot 851 illustrates the current error for the average-current regulation caused by the curvature of IL with an inductor value of 44 μH, and plot 852 illustrates the current error for the average-current regulation caused by the curvature of IL with an inductor value of 22 μH.

As shown in FIG. 8B, the curvature-induced error in the average-current regulation may be zero when the duty cycle of high-side transistor 41 is at fifty percent. The error may then vary as the duty cycle varies above or below fifty percent. As shown by plot 852 relative to plot 851 in FIG. 8B, a smaller inductance value may cause the error curve to have a different shape and a greater magnitude across duty cycles greater and lesser than fifty percent. The smaller inductance value may result in a greater curvature-induced error due to the larger ripple on the IL curve that may be present at a given switching frequency and average-current setting due to the smaller inductance value.

Figure 8C:
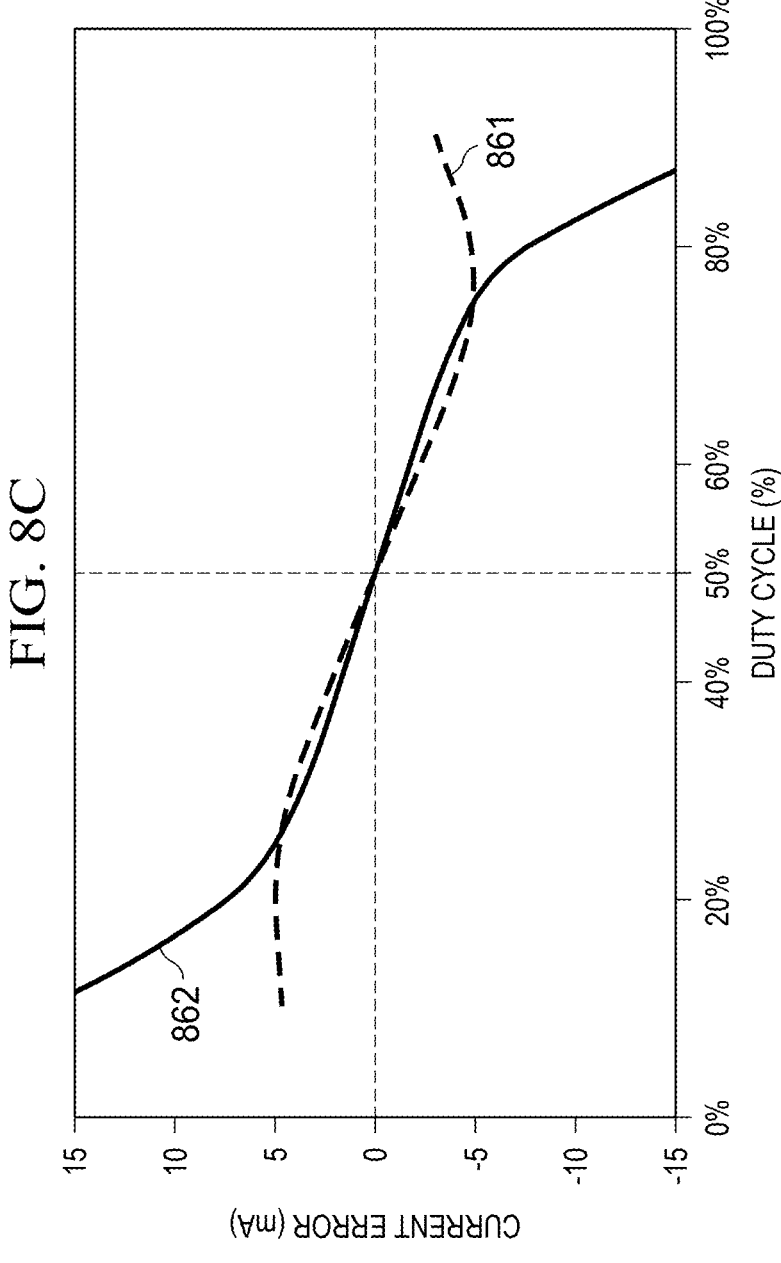
FIG. 8C illustrates plot diagrams of a curvature error in accordance with embodiments of the present disclosure.

FIG. 8C illustrates plot diagrams of a curvature error in accordance with embodiments of the present disclosure. Specifically, FIG. 8C illustrates plot diagrams demonstrating the effect that the switching frequency of high-side transistor 41 and low-side transistor 42 may have on the curvature error for the DC-DC converter formed by DC-DC converter circuit 201, inductor 43, and capacitor 44. As described above, in some embodiments, the switching frequency of high-side transistor 41 and low-side transistor 42 may vary or may be controlled and/or held constant by control circuit 202. Plot 861 and plot 862 illustrate the current error for the average-current regulation caused by the curvature of IL under different switching frequency conditions. For example, plot 861 illustrates the current error for the average current regulation caused by the curvature of IL when control circuit 202 holds the switching frequency at 500 kHz for example, and plot 862 illustrates the current error for the average-current regulation caused by the curvature error of IL when the switching frequency is uncontrolled and thus follows the hysteretic operation of control circuit 202.

As shown in FIG. 8C, the curvature-induced error in the average-current regulation may be zero when duty cycle of high-side transistor 41 is at fifty percent. The error may then vary as the duty cycle varies above or below fifty percent. As shown by plot 862 relative to plot 861 in FIG. 8C, the varied switching frequency may cause the error curve to have a different shape and a greater magnitude, particularly at small duty cycles below twenty-five percent and large duty cycles above seventy-five percent. As described below with reference to FIG. 8D, curvature compensation circuit 216 may account for these factors, and other factors, when compensating for curvature-induced errors.

Figure 8D:
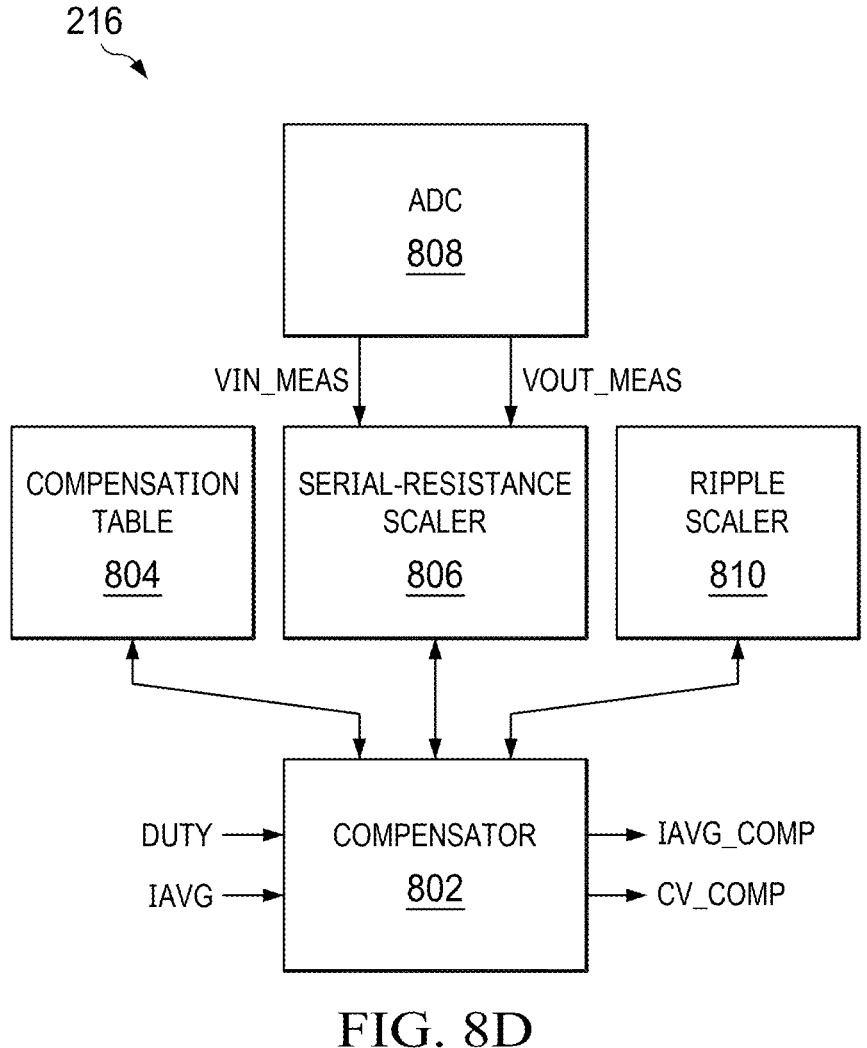
FIG. 8D illustrates a schematic block diagram of a curvature compensation controller in accordance with embodiments of the present disclosure.

FIG. 8D illustrates a schematic block diagram of curvature compensation circuit 216 in accordance with embodiments of the present disclosure. Curvature compensation circuit 216 may be implemented in any suitable fashion according to the operation described in the present disclosure. In some embodiments, curvature compensation circuit 216 may include compensator 802, compensation table 804, serial-resistance scaler 806, analog-to-digital converter (ADC) 808, and ripple scaler 810.

Curvature compensation circuit 216 may be configured to adjust an average-current regulation of DC-DC converter circuit 201 shown in FIG. 2A in response to the duty cycle of high-side transistor 41 and a set of compensation coefficients. Specifically, curvature compensation circuit 216 may be configured to adjust the average current of DC-DC converter circuit 201 in response to the duty cycle of high-side transistor 41 and a set of compensation coefficients that may compensate for the error induced by the curvature of IL. As described above, the respective high-side and low-side currents through high-side transistor 41 and low-side transistor 42 of DC-DC converter circuit 201 may collectively represent the inductor current IL of inductor 43, and thus also the output current IOUT. By adjusting the average current or the average-current regulation of DC-DC converter circuit 201, curvature compensation circuit 216 may thus adjust the average output current for the buck converter within LED lighting system 200 as a whole.

In some embodiments, compensator 802 may store a set of compensation coefficients to be applied to adjust the average-current regulation based on the duty cycle of high-side transistor 41. As shown collectively in FIG. 2A and FIG. 8D, compensator 802 may receive a duty cycle signal DUTY from time-comparison circuit 308. As described above with reference to FIG. 3A, time-comparison circuit 308 may receive counts for each of the first time period (t1), the second time period (t2), the third time period (t3), and the fourth time period (t4). The duty cycle is the ratio of the on-time (t1+t2) divided by the sum of the on-time plus the off-time (t1+t2+t3+t4) for high-side transistor 41. Thus, time-comparison circuit 308 may calculate the duty cycle and send the duty cycle signal DUTY representative of the duty cycle to the compensator 802 within curvature compensation circuit 216. Based on the duty cycle, compensator 802 may select and apply a corresponding compensation coefficient to the average-current regulation.

In some embodiments, the set of compensation coefficients may be fixed values dependent on the duty cycle. For example, the compensation coefficients may be selected from predefined curves based on the duty cycle. Compensator 802 may, in some embodiments, include a look-up table that may store a compensation coefficient for each of a plurality of duty cycles. Thus, in some embodiments, curvature compensation circuit 216, and compensator 802 in particular, may be configured to select the compensation coefficient from the look-up table based on the duty cycle. In other embodiments, curvature compensation circuit 216, and compensator 802 in particular, maybe configured to provide the compensation coefficient based on a programmed compensation-function that outputs a coefficient-value as a function of the duty cycle. In such embodiments, the programmed compensation-function may approximate the required curvature compensation as a function of the duty cycle.

Compensator 802 may thus receive the duty cycle information from time-comparison circuit 308 and provide the corresponding compensation coefficient from a compensation-function or select the corresponding compensation coefficient from a look-up table. In some embodiments, the look-up table may be programmable. For example, the look-up table may be populated with fixed and/or programmed values for the compensation coefficients. In some embodiments, DC-DC converter circuit 201 and/or LED lighting system 200 as a whole may be tested under varied conditions and the look-up table may be programmed based on the results of the measured output current IOUT versus the average-current setting IAVG across different duty cycles.

Curvature compensation circuit 216 may be configured to adjust the average-current regulation of DC-DC converter circuit 201 shown in FIG. 2A in one or more ways. In some embodiments, curvature compensation circuit 216 may be configured to provide the compensated average-current threshold IAVG_COMP to control circuit 202 in response to an average-current setting IAVG and a compensation coefficient that is based at least in part on the duty cycle of high-side transistor 41. For example, curvature compensation circuit 216 may be configured to adjust the average-current threshold based on a set of compensation coefficients and the duty cycle of high-side transistor 41. The compensator 802 within curvature compensation circuit 216 may select a compensation coefficient, for example from a look-up table, based on the duty cycle of high-side transistor 41, and may apply the selected compensation coefficient to the average-current setting IAVG to generate the compensated average-current threshold IAVG_COMP. As described above with reference to FIG. 2A and FIG. 5A, curvature compensation circuit 216 may in turn provide the compensated average current threshold IAVG_COMP to average-current reference generator 230, which may provide the high-side average current reference IAVG_HS and the low-side average current reference IAVG_LS to high-side comparator 261 and to low-side comparator 262 respectively.

Although control circuit 202 is described above as a hysteretic control circuit that regulates the average current of DC-DC converter circuit 201 and the average current of DC-DC converter as a whole, curvature compensation circuit 216 may in some embodiments also provide curvature compensation for other types of average-current regulation controls circuits. For example, curvature compensation circuit 216 may provide a compensated average-current threshold IAVG_COMP based on the average-current setting IAVG and the selected and/or scaled compensation coefficient to control circuits that, for example, utilize a fixed switching frequency and modulate the on-time and/or off-time of the high-side transistor to regulate the average current, or as another example utilize a fixed on-time and/or off-time of the high-side transistor and modulate the switching frequency to regulate the average current. In such other embodiments, the curvature compensation may operate in the same manner as described herein with reference to embodiments involving the hysteretic control of control circuit 202.

Curvature compensation circuit 216 may also, in some embodiments, be configured to scale a comparison of a sum of the first time period (t1) and the fourth time period (t4) against a sum of the second time period (t2) and the third time period (t3) based on a set of compensation coefficients and the duty cycle. The compensator 802 within curvature compensation circuit 216 may select a compensation coefficient, for example from a look-up table, based on the duty cycle of high-side transistor 41, and may generate a scaling factor. Compensator 802 may then send a compensation signal CV_COMP, indicating the scaling factor, to the time-comparison circuit 308 within timer circuit 212. Time-comparison circuit 308 may then scale comparison of the sum of the first time period (t1) and the fourth time period (t4) against a sum of the second time period (t2) and the third time period (t3) when determining adjustments to the peak threshold and the valley threshold and outputting P_ADJ and V_ADJ accordingly. For example, according to the scaling factor, time-comparison circuit 308 may target adjustments to the peak threshold and/or the valley threshold to make the sum of t1 plus t4 either less or more than the sum of t2 plus t3 by an amount that may compensate against the curvature error and bring the average output current in line with the average-current setting IAVG.

In some embodiments, curvature compensation circuit 216 may be configured to adjust the average-current regulation of the DC-DC converter based at least in part on a serial parasitic resistance associated with the DC-DC converter. For example, the compensation coefficient provided by curvature compensation circuit 216 may be based on a parasitic serial resistance value associated with the DC-DC converter. Serial-resistance scaler 806 may provide information to compensator 802 regarding serial parasitic resistance present in the DC-DC converter. As described above, the serial parasitic resistance of the DC-DC converter may include one or more of the on-state resistances of high-side transistor 41 and low-side transistor 42, the series resistance of inductor 43, and/or the series resistance of the plurality of LEDs 104a-104n. As also described above, the curvature error induced by the serial parasitic resistance may depend on the serial parasitic resistance, with larger serial parasitic resistance causing larger curvature error. Thus, to account for the serial parasitic resistance, compensator 802 may select the compensation coefficient and/or scale the compensation coefficient, for a given duty cycle, based on an input from serial-resistance scaler 806.

In some embodiments, the parasitic serial resistance value may be programmable. For example, serial-resistance scaler 806 may be programmed with an expected or measured serial parasitic resistance value. In other embodiments, curvature compensation circuit 216, and serial-resistance scaler 806 in particular, may be configured to calculate the parasitic serial resistance value based on the input voltage VIN, the output voltage VOUT, the duty cycle of high-side transistor 41, and the average-current setting IAVG. The serial parasitic resistance may be calculated, for example, by dividing the difference between the ideal output voltage and the actual output voltage VOUT by the output current IOUT. For a buck-topology DC-DC converter, such as shown in FIG. 2A, the ideal output voltage may equal VIN times the duty cycle. Thus, the parasitic resistance may be calculated based on the input voltage VIN, the actual output voltage VOUT, the duty cycle, and the output current IOUT. As shown in FIG. 8D, serial-resistance scaler 806 may receive the duty cycle information via the DUTY signal received by compensator 802. Further, serial-resistance scaler 806 may utilize the average-current setting IAVG as an approximation of the actual average output current IOUT. In addition, ADC 808 may measure VIN and VOUT and provide measurement signals VIN_MEAS and VOUT_MEAS to serial-resistance scaler 806. Accordingly, based on the input voltage VIN, the actual output voltage VOUT, the duty cycle, and an approximation of the output current IOUT, serial-resistance scaler 806 may calculate the serial-parasitic resistance present in the DC-DC converter in which DC-DC converter circuit 201 is implemented. And as described directly above, compensator 802 may select the compensation coefficient and/or scale the compensation coefficient, for a given duty cycle, based on the serial-parasitic resistance information from serial-resistance scaler 806.

In some embodiments, curvature compensation circuit 216 may be configured to adjust the average-current regulation of the DC-DC converter based at least in part on the switching frequency of high-side transistor 41 and/or low-side transistor 42. For example, the compensation coefficient provided by curvature compensation circuit 216 may be based on the switching frequency of high-side transistor 41 and/or low-side transistor 42. As shown collectively in FIG. 2A and FIG. 8D, compensator 802 may receive a duty cycle signal DUTY from time-comparison circuit 308. As described above with reference to FIG. 3A, time-comparison circuit 308 may receive counts for each of the first time period (t1), the second time period (t2), the third time period (t3), and the fourth time period (t4). The duty cycle is the ratio of the on-time (t1+t2) divided by the sum of the on-time plus the off-time (t1+t2+t3+t4) for high-side transistor 41. And as described above with reference to FIG. 8D, time-comparison circuit 308 may calculate the duty cycle and send the duty cycle signal DUTY representative of the duty cycle to the compensator 802 within curvature compensation circuit 216.

Additionally, the sum of t1, t2, t3, and t4 may represent the switching period of high-side transistor 41 and low-side transistor 42, which is the inverse of the switching frequency thereof. Accordingly, time-comparison circuit 308 may calculate the switching frequency and send the switching frequency information to compensator 802 as part of the DUTY signal, or via a separate signal dedicated to communicating the switching frequency. Based on the switching frequency, compensator 802 may select and/or scale the compensation coefficients to adjust the average-current regulation according to the switching frequency of high-side transistor 41 and/or low-side transistor 42.

In some embodiments, curvature compensation circuit 216 may be configured to adjust the average-current regulation of the DC-DC converter based at least in part on a current ripple of the DC-DC converter. For example, the compensation coefficient provided by curvature compensation circuit 216 may be based on a current-ripple value for DC-DC converter circuit 201. Ripple scaler 810 may provide information to compensator 802 regarding current ripple present in the DC-DC converter. As described above, the curvature error may depend in part on the amount ripple in the inductor current IL during a given switching cycle, with larger current ripples causing larger curvature error. Thus, to account for the current ripple of IL, compensator 802 may either select the compensation coefficient or scale a compensation coefficient, for a given duty cycle, based on the input from ripple scaler 810.

In some embodiments, ripple scaler 810 may be programmed with an expected or measured current ripple value.

In other embodiments, ripple scaler 810 may calculate the current ripple present in the DC-DC converter. For example, though not shown in FIG. 8D, ripple scaler 810 may receive information regarding the peak threshold and the valley threshold used by peak comparator 251 and valley comparator 252. Ripple scaler 810 may then calculate the current ripple based on the difference between the peak threshold and the valley threshold, and provide the calculated current ripple to compensator 802. In such embodiments, the current-ripple value may represent a difference between the peak current of the DC-DC converter circuit and a valley current of the DC-DC converter circuit.

The amount of current ripple in the DC-DC converter may depend, for example, on the inductance of inductor 43. Thus, in some embodiments, the compensation coefficient provided by curvature compensation circuit 216 may be based on an inductance value representative of the inductance of inductor 43. In some embodiments, the inductance value may be programmable. In other embodiments, curvature compensation circuit may be configured to calculate the inductance value based on one of a high-side on-time of high-side transistor 41 and a low-side on-time of low-side transistor 42 and based on a difference between a peak current of DC-DC converter circuit 201 and a valley current of DC-DC converter circuit 201. The inductance value may be calculated and used as a scaler in place of or in addition to the current ripple information provided by ripple scaler 810 to compensator 802. Inductance (L) may be calculated for example by the voltage applied across the inductor divided by the rate of change in the current ($L=V_L/(di/dt)$). During the on-time of high-side transistor 41, the voltage across the inductor may be equal to the input voltage VIN minus the output voltage VOUT. Further, the rate of change of the rising current (di/dt) during the on-time of high-side transistor 41 may be the difference between the valley threshold and the peak threshold divided by the sum of the first time period (t1) and the second time period (t2). Conversely, during the on-time of low-side transistor 42, the voltage across the inductor may be equal to zero minus the output voltage VOUT. Further, the rate of change of the falling current (di/dt) during the on-time of low-side transistor 42 may be the difference between the peak threshold and the valley threshold divided by the sum of the third time period (t3) and the fourth time period (t4). Thus, based on the aforementioned inputs, ripple scaler 810 may calculate the inductance value for inductor 43 and provide the inductance value to compensator 802 for selecting and/or scaling the compensation coefficients.

FIG. 9 illustrates an example method 900 for operating a DC-DC converter circuit in accordance with embodiments of the present disclosure. Method 900 may be performed by any suitable mechanism, such as the elements of DC-DC converter circuit 201 described herein. Method 900 may be performed with fewer or more steps than shown in FIG. 9. Moreover, steps of method 900 may be omitted, repeated, performed in parallel, performed in a different order than shown in FIG. 9, or performed recursively. One or more steps of method 900, although shown in an order, may be performed at the same time or in a re-ordered manner.

Step 902 may include comparing a high-side current through a high-side transistor against a peak threshold to generate a peak signal. For example, as described above with reference to FIG. 2A, peak comparator 251 may compare the high-side current through high-side transistor 41 against a peak threshold to generate peak signal CP.

Step 904 may include comparing a low-side current through a low-side transistor against a valley threshold to generate a valley signal. For example, as described above with reference to FIG. 2A, valley comparator 252 may compare the low-side current through low-side transistor 42 against a valley threshold to generate valley signal CV.

Step 906 may include driving a high-side transistor and a low-side transistor of the DC-DC converter in response to the peak signal and the valley signal. For example, as described above with reference to FIG. 2A, PWM circuit 240 may drive high-side transistor 41 and low-side transistor 42 in response to the peak signal CP and the valley signal CV. At the beginning of a switching cycle, PWM circuit 240 may drive high-side transistor 41 in an on-state and low-side transistor 42 in an off-state. During the on-time of high-side transistor 41, the high-side current through high-side transistor 41 and inductor 43 will rise. When the high-side current reaches and crosses above the peak threshold, peak comparator 251 may assert the peak signal CP to instruct PWM circuit 240 to turn off high-side transistor 41 and to turn on low-side transistor 42. During the on-time of low-side transistor 42, the low-side current through inductor 43 and low-side transistor 42 may decrease from a value at or near the peak threshold. When the low-side current reaches and crosses below the valley threshold, valley comparator 252 may assert the valley signal CV to instruct PWM circuit 240 to turn off low-side transistor 42 and to turn on high-side transistor 41 to start a new switching cycle.

Step 908 may include measuring a first time period during which the high-side current is less than an average-current threshold. And step 910 may include measuring a second time period during which the high-side current is greater than the average-current threshold. For example, as described above with reference to FIG. 2A and FIG. 3A, timer circuit 212 may be configured to measure the first time period (t1) during which the high-side current is less than the average-current threshold, and to measure the second time period (t2) during which the high-side current is greater than the average-current threshold, based on the clock signal CLK and the high-side comparison signal CAHS. To measure the first time period (t1), high-side counter 302 within timer circuit 212 may count the number of clock pulses when high-side comparison signal CAHS indicates that the high-side current is less than the average-current threshold. Likewise, to measure the second time period (t2), high-side counter 302 may count the number of clock pulses when high-side comparison signal CAHS indicates that the high-side current is greater than the average-current threshold.

Step 912 may include measuring a third time period during which the low-side current is greater than the average-current threshold. And step 914 may include measuring a fourth time period during which the low-side current is less than the average-current threshold. For example, as described above with reference to FIG. 2A, timer circuit 212 may be configured to measure the third time period (t3) during which the low-side current is greater than the average-current threshold, and to measure the fourth time period (t4) during which the low-side current is less than the average-current threshold, based on the clock signal CLK and the low-side comparison signal CALS. To measure the third time period (t3), low-side counter 304 within timer circuit 212 may count the number of clock pulses when low-side comparison signal CALS indicates that the low-side current is greater than the average-current threshold. Likewise, to measure the fourth time period (t4), low-side counter 304 may count the number of clock pulses when low-side comparison signal CALS indicates that the low-side current is less than the average-current threshold.

Step 916 may include adjusting the peak threshold and the valley threshold in response to the first time period, second time period, third time period, and fourth time period. In some embodiments, the adjusting may specifically include adjusting the peak threshold and the valley threshold based on a comparison of a sum of the first time period and the fourth time period against a sum of the second time period and the third time period. For example, as described above with reference to FIG. 2A and FIG. 3A, timer circuit 212, and in particular the time-comparison circuit 308 of timer circuit 212, may be configured to adjust the peak threshold and the valley threshold based on the comparison of a sum of the first time period (t1) and the fourth time period (t4) against a sum of the second time period (t2) and the third time period (t3). For example, to the extent that the sum of t1 plus t4 differs from the sum of t2 plus t3, time-comparison circuit 308 of timer circuit 212 may provide a peak adjustment signal P_ADJ and/or a valley adjustment signal V_ADJ to peak-and-valley controller 214. The adjustment to the peak threshold and/or the valley threshold may be targeted to bring the sum of t1 plus t4 in alignment with the sum of t2 plus t3, such that the average output current of the buck converter may accurately track the desired average output current.

Although examples have been described above, other modifications and variations may be made from this disclosure without departing from the spirit and scope of these examples. The above descriptions of various embodiments illustrate the principles of the invention. Numerous variations and modifications will become apparent to those skilled in the art based on the above disclosure. The following claims are intended to embrace all such variations and modifications.

What is claimed is:

1. A DC-DC converter circuit, comprising:
a high-side transistor coupled between a first input supply node and a switching node;
a low-side transistor coupled between the switching node and a second input supply node; and
a peak comparator configured to compare a high-side current through the high-side transistor against a peak threshold;
a valley comparator configured to compare a low-side current through the low-side transistor against a valley threshold;
a timer circuit configured to:
measure a first time period during which the high-side current is less than an average-current threshold;
measure a second time period during which the high-side current is greater than the average-current threshold;
measure a third time period during which the low-side current is greater than the average-current threshold;
measure a fourth time period during which the low-side current is less than the average-current threshold; and
adjust the peak threshold and the valley threshold in response to the first time period, second time period, third time period, and fourth time period.

2. The DC-DC converter circuit of claim 1, wherein the timer circuit is configured to adjust the peak threshold and the valley threshold based on a comparison of a sum of the first time period and the fourth time period against a sum of the second time period and the third time period.

3. The DC-DC converter circuit of claim 1, further comprising:

a high-side comparator configured to compare the high-side current against the average-current threshold and to generate a high-side comparison signal; and a low-side comparator configured to compare the low-side current against the average-current threshold and to generate a low-side comparison signal.

4. The DC-DC converter circuit of claim 3, wherein:

the high-side comparator is a chopper-stabilized high-side comparator; and the low-side comparator is a chopper-stabilized low-side comparator.

5. The DC-DC converter circuit of claim 4, wherein the timer circuit is configured to adjust the peak threshold and the valley threshold in response to a first average of the first time period across two or more chopper phases, a second average of the second time period across the two or more chopper phases, a third average of the third time period across the two or more chopper phases, and a fourth average of the fourth time period across the two or more chopper phases.

6. The DC-DC converter circuit of claim 4, wherein:

the high-side comparator includes a high-side offset controller configured to adjust a high-side comparator offset in response to a high-side offset signal from the timer circuit; and the low-side comparator includes a low-side offset controller configured to adjust a low-side comparator offset in response to a low-side offset signal from the timer circuit.

7. The DC-DC converter circuit of claim 3, wherein the timer circuit includes:

a high-side counter configured to measure the first time period and the second time period based on the high-side comparison signal and a clock signal; and a low-side counter configured to measure the third time period and the fourth time period based on the low-side comparison signal and the clock signal.

8. The DC-DC converter circuit of claim 7, wherein:

the timer circuit is further configured to blank the high-side comparison signal during a high-side blanking period; and the timer circuit is further configured to blank the low-side comparison signal during a low-side blanking period.

9. The DC-DC converter circuit of claim 1, wherein the timer circuit is configured to adjust the peak threshold and the valley threshold based on a comparison of the third time period and the fourth time period when the first time period is less than a high-side blanking period.

10. The DC-DC converter circuit of claim 1, wherein the timer circuit is configured to adjust the peak threshold and the valley threshold based on a comparison of the first time period and the second time period when the third time period is less than a low-side blanking period.

11. The DC-DC converter circuit of claim 1, further including a curvature compensation circuit configured to adjust an average-current regulation of the DC-DC converter circuit in response to a duty cycle of the high-side transistor.

12. The DC-DC converter circuit of claim 11, wherein the curvature compensation circuit is configured to adjust the average-current threshold based on a set of compensation coefficients and the duty cycle.

13. The DC-DC converter circuit of claim 11, wherein the curvature compensation circuit is configured to scale a comparison of a sum of the first time period and the fourth time period against a sum of the second time period and the third time period based on a set of compensation coefficients and the duty cycle.

14. The DC-DC converter circuit of claim 11, wherein the curvature compensation circuit is configured to adjust the average-current regulation of the DC-DC converter circuit based at least in part on a serial parasitic resistance value.

15. The DC-DC converter circuit of claim 11, wherein the curvature compensation circuit is configured to adjust the average-current regulation of the DC-DC converter circuit based at least in part on a current-ripple value.

16. The DC-DC converter circuit of claim 1, further comprising a pulse-width modulation (PWM) circuit configured to:

receive a peak signal from the peak comparator;

receive a valley signal from the valley comparator; and drive the high-side transistor and the low-side transistor in response to the peak signal and the valley signal; and wherein the PWM circuit comprises a digital filter configured to digitally filter the peak signal from the peak comparator and to digitally filter the valley signal from the valley comparator.

17. An LED driver circuit, comprising:

a high-side transistor coupled between a first input supply node and a switching node;

a low-side transistor coupled between the switching node and a second input supply node; and a peak comparator configured to compare a high-side current through the high-side transistor against a peak threshold;

a valley comparator configured to compare a low-side current through the low-side transistor against a valley threshold;

a PWM circuit configured to drive the high-side transistor and the low-side transistor in response to a peak signal from the peak comparator and a valley signal from the valley comparator;

a timer circuit configured to:

measure a first time period during which the high-side current is less than an average-current threshold;

measure a second time period during which the high-side current is greater than the average-current threshold;

measure a third time period during which the low-side current is greater than the average-current threshold;

measure a fourth time period during which the low-side current is less than the average-current threshold; and adjust the peak threshold and the valley threshold in response to the first time period, second time period, third time period, and fourth time period.

18. The LED driver circuit of claim 17, wherein the timer circuit is configured to adjust the peak threshold and the valley threshold based on a comparison of a sum of the first time period and the fourth time period against a sum of the second time period and the third time period.

19. A method for regulating an average current of a DC-DC converter, comprising:

comparing a high-side current through a high-side transistor against a peak threshold to generate a peak signal;

comparing a low-side current through a low-side transistor against a valley threshold to generate a valley signal;

driving the high-side transistor and the low-side transistor of the DC-DC converter in response to the peak signal and the valley signal;

measuring a first time period during which the high-side current is less than an average-current threshold;

measuring a second time period during which the high-side current is greater than the average-current threshold;

measuring a third time period during which the low-side current is greater than the average-current threshold;

measuring a fourth time period during which the low-side current is less than the average-current threshold; and adjusting the peak threshold and the valley threshold in response to the first time period, second time period, third time period, and fourth time period.

20. The method of claim 19, further comprising adjusting the peak threshold and the valley threshold based on a comparison of a sum of the first time period and the fourth time period against a sum of the second time period and the third time period.

\* \* \* \* \*